United States Patent [19]

Corinthios

[11] 3,754,128

[45] Aug. 21, 1973

[54] HIGH SPEED SIGNAL PROCESSOR FOR VECTOR TRANSFORMATION

[76] Inventor: Michael J. G. Corinthios, 35 Charles St. W., Toronto, Ontario, Canada

[22] Filed: Aug. 31, 1971

[21] Appl. No.: 176,644

[52] U.S. Cl. .......... 235/156

[51] Int. Cl. .......... G06f 7/38, G06f 15/34

[58] Field of Search .......... 235/156, 152; 324/77 G, 77 H

[56] References Cited

UNITED STATES PATENTS

| | | | |
|---|---|---|---|
| 3,573,446 | 4/1971 | Bergland | 235/156 |
| 3,638,004 | 1/1972 | Sloane | 235/156 |

OTHER PUBLICATIONS

J. A. Glassman, "A Generalization of the Fast Fourier Transform", IEEE Trans. on Computers, Vol. G19, No. 2, Feb. 1970 pp. 105–116.

M. Drubin, "Kronecker Product Factorization of the FFT Matrix", IEEE Trans. on Computers, May 1971, pp. 590–593.

*Primary Examiner*—Malcolm A. Morrison
*Assistant Examiner*—David H. Malzahn
*Attorney*—Alan Swabey and Robert E. Mitchell

[57] ABSTRACT

A signal processor for real-time signal analysis with three different implementations. The processor accepts as an input a vector which is to be multiplied by a transformation matrix. The first implementation is in the form of an asymmetric processor comprising an input memory, an output memory, an arithmetic unit, a weighting coefficients signal source, signal selection means, and a control unit. Each of the input and output memories is divided into $r$ queues where $r$ is the value of the radix of factorization of the transformation matrix. The weighting coefficients signal source feeds $(r-1)$ predetermined coefficients to the arithmetic unit. The values of the weighting coefficients, obtained through the factorization of the said transformation matrix, are of uniformly ascending order. The processor is suited for implementing either post permutation or ordered input ordered output algorithms. The second implementation is in the form of a symmetric processor having $r$ parallel channels in which arithmetic is simultaneously performed. This processor is faster than a corresponding asymmetric processor due to the fact that the weighting coefficients are simultaneously fed to the arithmetic unit in the form of $r$ inputs, or channels, rather than $(r-1)$. Arithmetic is thus performed with a level of parallelism that is equal to $r$, as compared to $(r-1)$ in the case of the asymmetric processor. The third implementation is in the form of a processor comprising a first memory, a second memory, an arithmetic unit, a weighting coefficients signal source, first and second signal selection means, and a control unit. The first and second memories are each divided into $r^2$ queues. In this processor the arithmetic unit is not fully wired-in but is utilized in 100 percent of the time of processing.

In any of the said three implementations real time processing is achieved by accumulating new data in an input buffer memory while the older record is being processed.

14 Claims, 17 Drawing Figures

HIGH SPEED SIGNAL PROCESSOR FOR VECTOR TRANSFORMATION

BACKGROUND OF THE INVENTION

1. Field of the Invention

This invention relates to a signal processor comprising an optional level of parallelism and wired-in architecture and, more particularly, to a machine organization and a signal processor for spectral analysis.

2. Statement of the Prior Art

It is common in processors for spectral analysis to either comprise a special-purpose arithmetic unit which works in conjunction with a general-purpose computer, or to incorporate an organization similar to that of general-purpose computers. See, for example, 1. R. R. Shively, "A digital processor to generate spectra in real time", Institute of Electrical and Electronic Engineers (IEEE) Transactions on Computers, vol. C-17, May 1968, pp. 485- 491, 2. G. D. Bergland, "Fast Fourier transform hardware implementations—An overview", IEEE Transactions on Audio and Electroacoustics, vol. AU-17, June 1969, pp. 104–108, 3. R. C. Singleton, "A method for computing the fast Fourier transform with auxiliary memory and limited high-speed storage", IEEE Trans. Audio and Electroacoustics, vol. AU-15, June 1967, pp. 91–98, 4. M. C. Pease "Organization of large scale Fourier processors", Journal of the Association of Computing Machinery, vol. 16, July 1969, pp. 474 – 482, and 5. B. Gold, I. L., Lebow, P. G. McHugh, and C. M. Rader, "The FDP, a Fast Programmable Signal Processor", IEEE Transactions on Computers, Volume C-20, January 1971, pp. 33–38. Such machines comprise one or more random access memories in which data are stored, and accessing data at any stage of processing is obtained through memory addressing.

Computation of spectra is performed in these processors by implementing one of several forms of the fast Fourier transform algorithm. It is noted, however, that in these processors several shortcomings are inherent in the machine organization, having the effect of limiting the speed and increasing the complexity of such processors. These shortcomings are enumerated in the following:

1. The fast Fourier transform in its 'classical' form, as given in the paper: W. T. Cochran, J. W. Cooley, D. L. Favin, H. D. Helms, R. A. Kaenel, W. W. Lang, G. C. Maling, D. E. Nelson, C. M. Rader, and P. W. Welch, "What is the fast Fourier transform", Proceedings of the IEEE, vol. 55, Oct. 1967, pp. 1,664 – 1,674, and in any of the forms implemented by such processors, calls for accessing or storing data that are separated by a number of memory locations which varies between the several stages, or iterations, of processing. Thus, whereas at some stage of the computation the data, to be simultaneously processed by the arithmetic unit, are separated by, say, half the record size, in another stage of the computation we need to access, or store, data in adjacent memory locations. Two shortcomings thus arise, the first is the need for addressing to access or store data, and the second is the necessity of storing data in individual cells, since at some stage in the computation we have to simultaneously access neighbouring words. The need for data-addressing has its effect of increasing the size and complexity of the control unit, and the call for storing words in individual words has its effect on the cost, size and complexity of the machine's memory. Moreover, storage of the data record in a single large memory has the drawback that words cannot be accessed simultaneously but can only be read one at a time. Another shortcoming of such processors is the fact that they invariably implement the classical form of the fast Fourier transform algorithm, which, operating on a properly ordered time-series produces the output Fourier coefficients in a 'scrambled', or digit-reversed order. Alternatively an ordered set of output Fourier coefficients could be obtained by preshuffling the time-series before processing the data. Such processors, implementing these algorithms, therefore, spend in addition to the computation time some time in post-ordering of the output data, in order to provide properly ordered Fourier coefficients, or preshuffling the input time-series before actual processing of the data. Such a time spent in moving data for ordering them can be significant, particularly with present day technology where the speed of arithmetic matches and may exceed the speed of moving data in memory; and hence the time spent in ordering data may prove to be an appreciable fraction of the processing time.

These processors, moreover, implement mainly a radix-2 factorization of the discrete Fourier transform. The number of iterations, or stages, of computation are therefore proportional to $\log_2 N$, where N is the input record size, i.e. the number of points in the time series. As will be shown later, the implementation of high-radix transforms reduces the number of iterations and hence reduces the amount of accummulated round-off errors in processing.

In addition to the above mentioned processors, the literature includes descriptions of machines designed as special-purpose processors. See for example:

1. G. D. Berland and H. W. Hale, "Digital real-time spectral-analysis", IEEE Transactions on Electronic Computers, vol. EC-16, April 1967, pp. 180–185, 2. M. C. Pease, "An adaptation of the fast Fourier transform for parallel processing", Journal of the Association of Computing Machinery, vol. 15, April 1968, pp. 252–264, 3. H. L. Groginsky and G. A. Works, "A Pipeline fast Fourier transform", IEEE Transactions on Computers, vol. C-19, No. 11, November 1970, pp. 1,015–1019, 4. H. C. Andrews and K. L. Caspari, "A Generalized Technique for Spectral Analysis", IEEE Transactions on Computers, vol. C-19, No. 11, January 1970, pp. 16–25.

Such machines have the following shortcomings:

1. The machine of Bergland and Hale requires an arithmetic unit for each of the $\log_2 N$ stages of computation, which can be prohibitively expensive for large values of N. Moreover, this machine requires special switching hardware at each stage of the computation. In addition such processor requires pre-shuffling of data which is performed by additional special hardware at the input of the processor.
2. Pease's machine is a highly parallel processor which requires a large number of arithmetic units for each of the $\log_2 N$ stages of the computation and may prove to be, therefore, prohibitively expensive except for small sizes of data arrays.
3. The processor of Groginsky and Works in addition to suffering from the need to reorder its scrambled output incorporates a relatively large control unit and switching circuitry since it implements the classical Cooley Tukey Algorithm and thus, as was mentioned earlier, requires simultaneous accessing of data which are separated by memory locations that vary according to the stage of computation.

4. The processor of Andrews and Caspari implements the classical version of the fast Fourier transform algorithm, and thus suffers from the same drawbacks mentioned above, namely the need for addressing, for accessing neighbouring data, and for post-ordering of data in order to obtain properly ordered coefficients.
5. In most of the machines that have been discussed the weighting coefficients, in each stage of processing, are needed in a reverse-bit order. This makes the problem of generating or accessing them more complex than if the coefficients appeared in the algorithm in a properly ascending order.

SUMMARY OF THE INVENTION

The invention described herein introduces a machine of novel architecture in which the implemented algorithms and the machine building blocks are properly matched in order to achieve several objects.

It is an object of the invention to provide a signal processor incorporating a wired-in arithmetic unit; thus reducing the control to a minimum.

It is another object of the invention to provide a processor which operates on a properly ordered input time-series and produces properly ordered output coefficients without the need for pre-shuffling or post-ordering of data.

It is another object of the invention to provide a processor which implements algorithms that call for application of properly ordered weighting coefficients to the data during each stage of processing, thus simplifying the means by which the weighting coefficients are generated or accessed.

It is another object of the invention to provide a signal processor with a choice of the amount of parallelism in its architecture. Thus it is an object to provide a processor which can incorporate a relatively arbitrary level of parallelism while satisfying the above mentioned objects.

It is another object of the invention to provide a processor in which data are stored in sequentially accessed streams, and in which, for parallel processing, the data memory is partitioned into long queues and data are entered at the rear of these queues and accessed at their fronts; thus eliminating the need for data addressing.

It is another object of the invention to provide a processor in which tradeoff can be made such that a slight deviation from completely wired-in organization would yield higher processing speeds while satisfying all the above mentioned objects.

It is another object of the invention to provide a basic processor which is well suited for general signal analysis, for generalized spectrum analysis and other processes of time-series analysis such as, for example, the computation of the auto- and cross-correlation functions and convolution functions. In the case of generalized spectrum analysis the object is to provide a processor which would compute a transformation of an input vector by applying the weighting coefficients of the particular transformation to be performed, e.g. Fourier transform, Walsh or Hadamard, Haar or similar transforms of generalized spectrum analysis.

It is another object of the invention to provide a processor that implements algorithms obtained by factoring the transformation matrix to different radices. Higher radices reduce the number of iterations and thus reduce the amount of accumulated round-off errors.

It is, moreover, an object of the invention to provide a processor that is well suited for the application in which the problem is the general one of applying a transformation matrix to an input vector, such that the transformation matrix is highly symmetric and can be factored into a series of matrix Kronecker products, as is the case in the fast Fourier transform algorithm.

These and other objects of the invention are achieved by a processor which implements machine-oriented algorithms, rather than the classical algorithms that have the previously mentioned drawbacks when the speed of processing, reduction of control, and real-time processing of wide-band signals is the objective. In one implementation the basic processor comprises an input memory having an input and a plurality of at least three outputs, an output memory having a plurality of at least three inputs and a plurality of at least three outputs, an arithmetic unit having a first plurality of at least three inputs and a second plurality of inputs less by one than the first plurality of inputs and a plurality of at least three outputs, a weighting coefficients signal source having a plurality of at least two outputs each connected to a corresponding one of said arithmetic unit second plurality of inputs for supplying said arithmetic unit with weighting coefficients signals, a signal selection means, referred to in the following as the signal selection circuitry, having a first input and a second plurality of inputs and an output, and a control unit feeding control signals to said input memory, said output memory, said weighting coefficients signal source, and said signal selection circuitry, each of said input memory plurality of outputs being connected to a corresponding one of said first plurality of arithmetic unit inputs and each output of said arithmetic unit being connected to a corresponding one of said output memory plurality of inputs, said output memory outputs being connected to said signal selection circuitry second plurality of inputs, said signal selection circuitry first input being an input vector to be transformed and said signal selection circuitry output connected to said input memory input, said control unit providing means for moving data in said input and output memories, for selecting one of said signal selection circuitry inputs for feeding it to said input memory input in a predetermined sequence, and for sequentially feeding selected predetermined weighting coefficients signals from said weighting coefficients signal source outputs to said arithmetic unit second plurality of inputs, said input memory having the form of a long queue which is divided into a plurality of at least three submemories in the form of shorter queues all connected in series, the input at the rear of the last of said submemories being said input memory input, the plurality of outputs at the fronts of the submemories are said input memory outputs, said output memory of same size as said input memory is divided into a plurality of at least three submemories having the form of queues, the plurality of inputs at the rears of said submemories are said output memory inputs, and the plurality of outputs at the fronts of said output memory submemories being said output memory outputs, the number of said input memory submemories is equal to that of said output memory submemories, both being equal to the value of the radix of factorization of the transformation matrix which is to be multiplied by said input vector, said arithmetic unit plurality of outputs being, at the end of processing, the required output vector that is the result of multiplying said transformation matrix by said input vector; and wherein said value of the radix of factorization of the transformation matrix is restricted, in this implementation, to be at least three.

In a second implementation the basic processor comprises an input memory having a plurality of inputs and a plurality of outputs, an output memory having a plurality of inputs and an output, an arithmetic unit having a first plurality of inputs and a second plurality of inputs equal in number to the first plurality of inputs and a plurality of outputs, a weighting coefficients signal source having a plurality of outputs each connected to a corresponding one of said arithmetic unit second plurality of inputs for supplying said arithmetic unit with weighting coefficients signals, a signal selection circuitry having a first and a second input and a plurality of outputs, and a control unit feeding control signals to said input memory, to said output memory, to said arithmetic unit, and to said signal selection circuitry, each of said input memory plurality of outputs being connected to a corresponding one of said first plurality of arithmetic unit inputs and each of said arithmetic unit outputs being connected to a corresponding one of said output memory plurality of inputs, said output memory output being connected to said signal selection circuitry second input, said signal selection circuitry first input being an input vector to be transformed and each of said signal selection circuitry plurality of outputs being connected to a corresponding one of said input memory plurality of inputs, said control unit providing means for moving data in said input and output memories, for selecting one of said signal selection circuitry inputs for feeding it to one of said input memory plurality of inputs in a predetermined sequence, for sequentially feeding selected predetermined weighting coefficients signals from said weighting coefficients signal source outputs to said arithmetic unit second plurality of inputs, and for providing signals to said arithmetic unit for bypassing predetermined arithmetic operations, said input memory is divided into a plurality of submemories having the form of queues, the plurality of inputs to said submemories are said input memory inputs and the plurality of outputs of said submemories are said input memory outputs, said output memory, having the form of a long queue, is divided into a plurality of submemories having the form of shorter queues all connected in series, the plurality of inputs to said output memory submemories are said output memory inputs, and the output at the front of the first of said output memory submemories being said output memory output, the number of said input memory submemories is equal to that of said output memory submemories, both being equal to the value of the radix of factorization of the transformation matrix which is to be multiplied by said input vector, said arithmetic unit plurality of outputs being, at the end of processing, the required output vector that is the result of multiplying said transformation matrix by said input vector; and wherein said value of the radix of factorization of said transformation matrix is integer.

In a third implementation the basic processor comprises a first memory having a plurality of inputs and a plurality of outputs, a second memory having a plurality of inputs and a plurality of outputs, an arithmetic unit having a first and a second pluralities of inputs and a plurality of outputs, a weighting coefficients signal source having a plurality of outputs each connected to a corresponding one of said arithmetic unit second plurality of inputs for supplying said arithmetic unit with weighting coefficients signals, a first signal selection circuitry having a first and a second pluralities of inputs and a plurality of outputs, a second signal selection circuitry having a first and a second pluralities of inputs and a plurality of outputs, and a control unit feeding control signals to said first memory, to said second memory, to said arithmetic unit, and to said first and second signal selection circuitries, each of said first memory plurality of outputs being connected to a corresponding one of said second signal selection circuitry first plurality of inputs and each of said second memory plurality of outputs being connected to a corresponding one of said second signal selection circuitry second plurality of inputs, each of said second signal selection circuitry plurality of outputs being connected to a corresponding one of said arithmetic unit first plurality of inputs and each of said arithmetic unit plurality of outputs being connected to a corresponding one of each of said first signal selection circuitry second plurality of inputs and to a corresponding one of each of said second memory plurality of inputs, said first signal selection circuitry first plurality of inputs feed into the processor an input vector to be transformed and each of said first signal selection circuitry plurality of outputs being connected to a corresponding one of said first memory plurality of inputs, said control unit providing means for moving data in said first and second memories, for sequentially selecting a predetermined plurality from said first and second memories pluralities of outputs for feeding it to said arithmetic unit first plurality of inputs, for sequentially selecting a predetermined plurality from first selection circuitry first and second pluralities of inputs for feeding it to said first memory plurality of inputs, for sequentially selecting predetermined weighting coefficients signals from said weighting coefficients signal source outputs for feeding them to said arithmetic unit second plurality of inputs, and for feeding signals to said arithmetic unit for bypassing predetermined arithmetic operations, said first memory and second memory are of the same size and each being divided into a plurality of submemories having the form of equal length queues each of which is further divided into a plurality of still shorter queues all connected in series and referred to in the following as the submemory queues, the plurality of inputs at the rears of said first memory submemories are said first memory inputs and the plurality of outputs at the fronts of said first memory submemory queues are said first memory plurality of outputs, the plurality of outputs of the submemory queues of each first memory submemory forms a subset of said first memory plurality of outputs, the plurality of inputs at the rears of said second memory submemories are said second memory inputs and the plurality of outputs at the fronts of said second memory submemory queues are said second memory plurality of outputs, the plurality of outputs of the submemory queues of each second memory submemory forms a subset of said second memory plurality of outputs, said second signal selection circuitry being a means for selecting one subset out of the subsets of both first and second memory pluralities of outputs, the number of said first memory submemories is equal to that of said second memory submemories, both being equal to the value of the radix of factorization of the transformation matrix which is to be multiplied by said input vector, the number of submemory queues in each of said first memory submemories is equal to the number of submemory queues in each of said second memory submemories, both being equal to the value of the radix of factorization of said transformation matrix, said arithmetic unit plurality of outputs being, at the end of processing, the required output vector that is the result of multiplying said transformation matrix by said input vector; and wherein said value of the radix of factorization of said input vector is integer.

BRIEF DESCRIPTION OF THE DRAWINGS

In drawings which illustrate embodiments of the invention.

DESCRIPTION OF THE PREFERRED EMBODIMENTS

Figure 1:
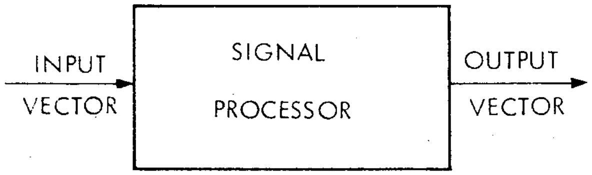
FIG. 1 is a block representation of the signal processor.

Referring to FIG. 1 the signal processor is shown to operate on an input vector and produce at its output an output vector. The processor applies a transformation on the input vector producing the output vector. Such transformation on the input vector can be expressed as the result of applying a transformation matrix to the input vector. The result of multiplying the transformation matrix by the input vector is the transformed output vector.

A transformation matrix considered here is one which may be obtainable from a series of matrix Kronecker products. The efficient implementation of such transformation is due to the high degree of redundancy in the description of the transformation matrix. Such redundancy can be eliminated by matrix factorization. The result of such factorization is a "fast" algorithm. Such technique was described by I. J. Good, "The Interaction Algorithm and Practical Fourier Analysis", Journal of the Royal Statistical Society (London), Volume B-20, pp. 361–372, 1958; and has resulted in the fast Fourier transform algorithm which is a factorization of a particular transformation matrix, namely, the discrete Fourier transform. It has resulted in the fast Walsh and Hadamard transforms and a larger class of transformations, such as described, for example, by H. C. Andrews and K. L. Caspari, "A Generalized Technique for Spectral Analysis", IEEE Transactions on Computers, Volume C-19, No. 1, January 1970, and by G. Apple and P. Wintz, "Calculations of Fourier Transforms on Finite Abelian Groups", IEEE Transactions on Information Theory, Volume IT-16, March 1970, pp. 233–234.

Figure 2:
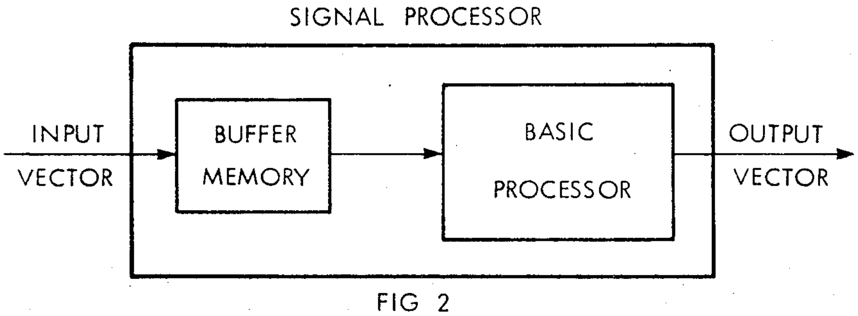
FIG. 2 is a block representation of the signal processor incorporating an input buffer memory for real-time processing of signals.

FIG. 2 shows in addition to the basic processor an input buffer memory which is incorporated in the processor for continuous on-line real-time processing of signals. While one record is being processed by the processor, the samples of the new record is accumulated. The operation is synchronized such that the buffer memory is unloaded into the processor while the previous record is being exited.

Figure 3:
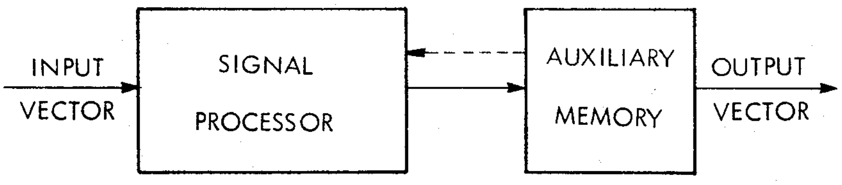
FIG. 3 is a block representation of the signal processor with an auxiliary memory for applications requiring the multiplication of two transformed vectors such as in the processes of cross-correlation and convolution of signals.
Figure 4:
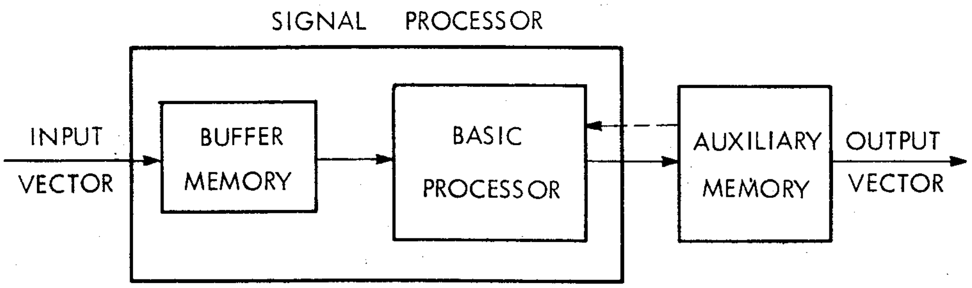
FIG. 4 is a block representation of the signal processor incorporating both an input buffer memory and auxiliary memory for applications requiring real-time multiplication of two transformed vectors.

FIG. 3 and FIG. 4 show variations to the block representations of FIG. 1 and FIG. 2 in that the processor includes an auxiliary memory. Such an auxiliary memory is useful for temporary storage of a transformed vector in operations requiring the multiplication of two transformed vectors. Thus one record is processed and the output vector stored in the auxiliary memory. Then the second record is processed and a second transformed vector thus obtained. The two records are then fed sequentially to the arithmetic unit for a point by point multiplication of their elements. As indicated by the dotted arrows, data may also be fed from the auxiliary memory to the processor.

Figure 5:
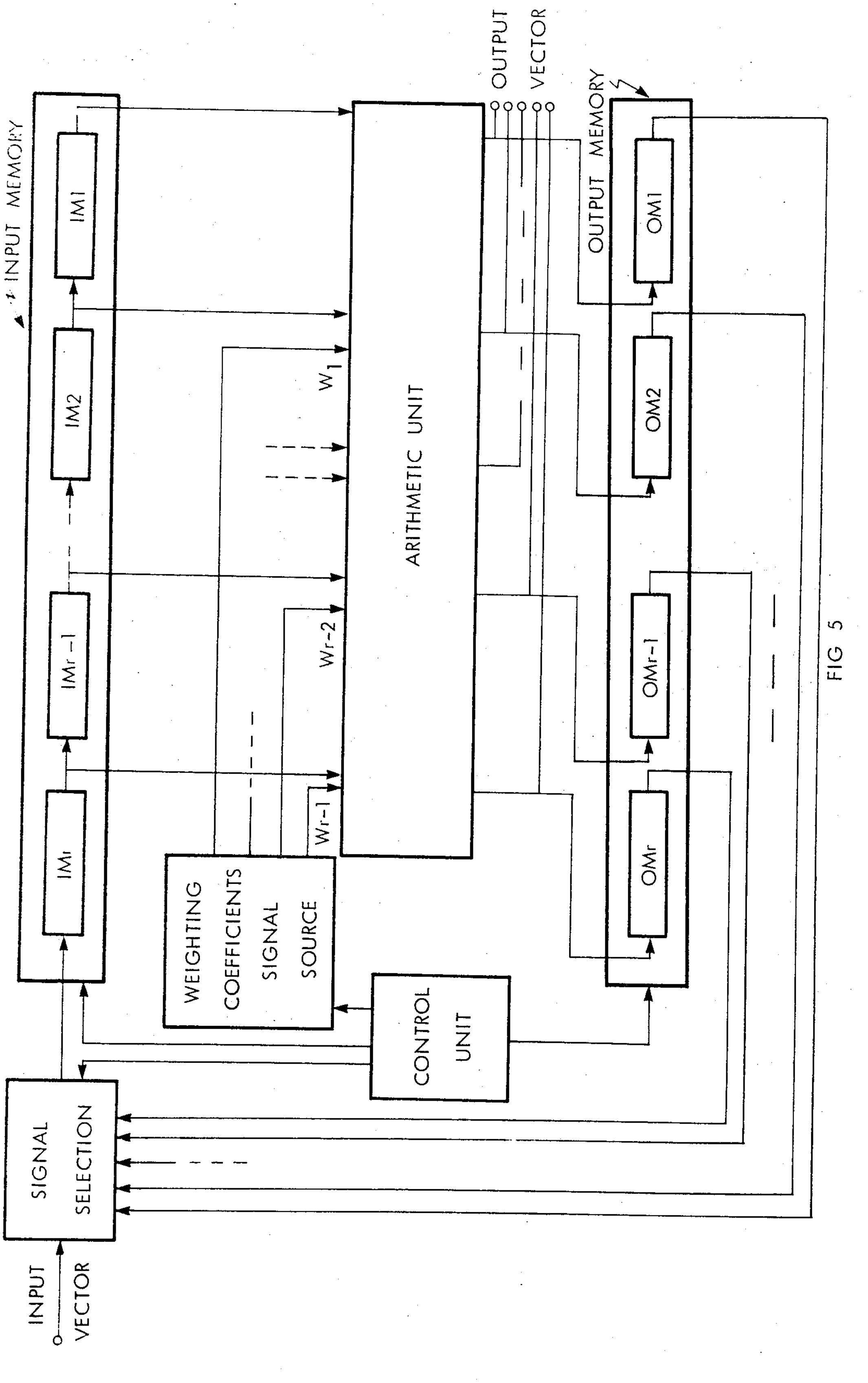
FIG. 5 is a first implementation of the basic signal processor, referred to in the following as asymmetric processor.

FIG. 5 is the first implementation of the signal processor. The processor applies Fast transformations to its input vector by implementing machine oriented algorithms. As is mentioned above, these transforms are factorable into the product of transformation matrices in such a way that a fast algorithm for computation is achieved. In the following, machine-oriented fast algorithms which are well suited for implementation by wired-in machines are described and utilized in the organization of the implementing machine. For simplicity of presentation of these machine-oriented fast algorithms, the description is made with reference to the discrete Fourier transform. The same concept is applicable, however, to the general class of factorable highly redundant transforms, as is demonstrated, for example, in the paper of Andrews and Caspari, referred to above. The algorithms presented here differ from those described in the papers of I. J. Good and of Andrews and Caspari in that those presented here are machine oriented. The algorithms are stated here without proof. For a complete derivation and systematic development of the algorithms implemented by the processors in each of the said first, second and third implementations, in the particular area of Fourier transformation, reference is to be made to the following papers: 1. M. J. Corinthios, "The design of a class of fast Fourier transform computers", IEEE Transactions on Computers, vol. C-20, June 1971, pp. 617–623, 2. M. J. Corinthios, "A fast Fourier transform for high-speed signal processing", IEEE Transactions on Computers, vol. C-20, August 1971, pp. 843–846. The organization of an asymmetric machine applied to the special case of a radix-2 factorization of the discrete Fourier transform has been published in the paper: M. J. Corinthios, "A Time Series Analyzer", vol. 19, Microwave Research Institute Symposia Series, New York: Polytechnic Press, 1969, pp. 47–61, and is not included within the scope of the present invention. The said first implementation which deals with asymmetric machines, is restricted, therefore, to values of the radix of factorization of the discrete Fourier transform (DFT) that are greater than two. The said second and third implementations which relate to symmetric and high speed processors, respectively, have no such restriction imposed on the value of the radix of factorization of the transformation matrix. Another reference, which deals with the ideas involved in the present invention will be published as a thesis dissertation for the degree of Doctor of Philosophy, Department of Electrical Engineering, University of Toronto, by M. J. Corinthios.

Let $f_s$ denote the $s^{th}$ sample of the time series obtained by sampling a generally complex time function $f(t)$ for a duration T. For N such samples the DFT is defined by $$\vec{F}_r = \frac{1}{N} \sum_{s=0}^{N=1} (\exp 2\pi jrs/N) f_s \tag{1}$$

where $F_r$ is the $r^{th}$ Fourier coefficient and $j = \sqrt{-1}$. Both the time increment ($s$) and the frequency increment ($r$) range between 0 and N−1.

If we denote the sets $f_s$ and $F_r$ respectively by the column vectors:

$$\vec{f} = \text{col}\ (f_0, f_1, \ldots, f_{N-1}), \tag{2}$$

and $$\vec{F} = \text{col}\ F_0 F,\ _{F1}, \ldots, F_{N-1}); \tag{3}$$

and if we define a matrix $\vec{T}_N$ of coefficients given by $$(\vec{T}_N)_{rs} = \exp(2\pi jrs/N) \tag{4}$$

$$= w^{rs} \tag{5}$$

where $$w = \exp(2\pi j/N) \tag{6}$$

then Eq. 1 can be written in the form $$\vec{F} = (1/N)\ \vec{T}_N \vec{f}. \tag{7}$$

To simplify the notation we preserve only the exponent of $w$. Thus, we write $k$ in place of $w^k$.

The matrix $\vec{T}_N$ in Eq. 7 is the finite Fourier transform, which operating on $\vec{f}$ yields the Fourier coefficients $\vec{F}$ (within a scale factor N).

In the following, the number of samples N is to be related to an arbitrary positive integer $r$ by the relation $N = r^n$, where $n$ is a positive integer.

It may be shown that $\vec{T}_N$ can be partitioned and factored and is thus written in the form $$\vec{T}_N = \prod_{m=1}^{n-1} \vec{Q}_i^{(r)} \prod_{m=1}^{n} (\vec{p}^{(r)} \vec{\mu}_m^{(r)} \vec{S}^{(r)}) \tag{8}$$

The superscript $r$ is the radix of factorization of the matrix $\vec{T}_N$;

$$\vec{Q}_i = \vec{P}_{N/r}{}^{(r)} i-1 \times \vec{I}_r i-1\ , \tag{9}$$

where the notation $\vec{I}_K$ denotes the identity matrix of dimension K, and $\vec{P}_K^{(r)}$ the ideal-shuffle-base-$r$ permutation matrix operating on a vector of dimension K. The × sign in Eq. (19) indicates the Kronecker product of matrices. $\mu_i^{(r)}$ is the weighting matrix and is given by $$\vec{\mu}_i^{(r)} = \vec{I}_r n-i \times \vec{D}_r i^{(r)}, \tag{10}$$

where in general $$\vec{D}_{N/k}^{(r)} = \text{quasidiag}\ (\vec{I}_{N/rk}, \vec{K}_k, \vec{K}_{2k}, \vec{K}_{3k}, \ldots, \vec{K}_{(r-1)k})$$

and $$\vec{K}_m = \text{diag}\ (0, m, 2m, 3m, \ldots, [(n/rk) - 1]m);$$

$\vec{S}^{(r)}$ is the preweighting operator given by $$\vec{S}^{(r)} = (\vec{I}_{N/r} \times \vec{T}_r) \quad (11)$$

where $$\vec{T}_r = \begin{bmatrix} 0 & 0 & 0 & 0 & \dots & 0 \\ 0 & N/r & 2N/r & 3N/r & \dots & (r-1)N/r \\ 0 & 2N/r & 4N/r & 6N/r & \dots & 2(r-1)N/r \\ . & . & . & . & \dots & . \\ 0 & (r-1)N/r & . & . & \dots & (r-1)^2N/r \end{bmatrix}$$

and $\vec{P}(r) = \vec{P}_N^{(r)}$.

We can rewrite $\vec{T}_N$ in the form $$\vec{T}_N = \vec{T}_p \vec{T}_c$$

where $\vec{T}_c$ is a computation matrix (Eq. 8):

$$\vec{T}_c = \prod_{m=1}^{n} (\vec{p}^{(r)} \vec{\mu}_m^{(r)} \vec{S}^{(r)}) \quad (12)$$

and $$\vec{T}_p = \prod_{m=1}^{n-1} Q_i^{(r)}$$

is a permutation one.

We notice that $$\vec{F} = (1/N)\, \vec{T}_p \vec{T}_c \vec{f}.$$

Let us write $$\vec{F}' = \vec{T}_p^{-1} \vec{F} = (1/N)\, \vec{T}_c \vec{f}. \quad (13)$$

Since $\vec{T}_p$ and hence $\vec{T}_p^{-1}$ is merely a permutation matrix, therefore $\vec{F}'$ is a vector including the same set of Fourier coefficients as in $\vec{F}$, except in a 'scrambled' order, as is the case in Cooley-Tukey algorithm with a general radix. Applying $\vec{T}_c$ to $\vec{f}$ as in Eq. 12, therefore, we obtain a scrambled set of Fourier coefficients.

In applying $\vec{T}_c$ to $\vec{f}$, Eq. 12 is utilized to carry out the process iteratively. The form of factorization as given by Eq. 12 is readily suited for a wired-in design.

The algorithm described by Eq. 12, or Eq. 8, will be referred to as the post permutation algorithm, since it yields a scrambled output coefficients which would require a permutation operation for yielding a properly ordered output. This algorithm is readily suited for implementation by the machines of the first implementation, i.e. the asymmetric machines, to be discussed. For applications requiring an ordered output, however, these same machines can readily implement a more suitable algorithm, namely, the ordered input ordered output asymmetric algorithm, which is described by the following equation $$\vec{T}_N = \prod_{m=1}^{n} (\vec{p}_m^{(r)} \vec{\mu}_m^{(r)} \vec{S}^{(r)}) \quad (14)$$

where $$\vec{P}_i^{(r)} = \vec{I}_r n-i \times \vec{P}_i^{(r)} \quad (15)$$

and $$\vec{P}_1 = \vec{\mu}_1 = \vec{I}_N\,;$$

the other matrices having been previously defined.

By applying $\vec{T}_N$ to $\vec{f}$ we obtain the Fourier coefficients in a proper order. In doing this the factorization given by Eq. 14 is utilized.

A description of the organization and operation of the asymmetric processor which would readily implement the asymmetric algorithms described by Eqs. 12 and 14 follows.

FIG. 5 shows the organization of an asymmetric processor for performing the general class of transformations in which a transformation matrix is multiplied by an input vector and which is factorable into Kronecker matrices including the shuffle operator thus yielding algorithms similar to those described by Eqs. 12 and 14.

The coefficients of the original transformation matrix before factorization determine the values of the weighting coefficients which are sequentially presented to the arithmetic unit during processing.

As shown in FIG. 5 the processor comprises an input memory, an output memory, an arithmetic unit, a weighting coefficients signal source, signal selection circuitry and a control unit. Each of the input and output memories is in the form of a long queue which is divided into $r$ submemories in the form of shorter queues, where $r$ is the radix of factorization of the transformation matrix. Data enter only at the rear of a queue and exit only from, i.e. are accessed only at, the front of the queue. Queues may be most effectively constructed of shift registers, delay lines or any similar means for serial storage and moving of data. If random access memories are used then the addressing of data is still simplified since storing data in and accessing data from a queue occurs always with a uniformly increasing word address.

The input memory submemories are all connected in series. The r outputs at the fronts of the input memory queues are connected to a first set of inputs of the arithmetic unit.

The weighting coefficients signal source outputs are connected to the arithmetic unit second set of inputs. The arithmetic unit has $r$ outputs each of which is connected to a corresponding one of output memory inputs, that is, to the rears of the output memory submemories. The $r$ outputs at the fronts of the output memory submemories are connected as a first set of inputs to the signal selection circuitry.

The signal selection circuitry has a second input that is the input vector to be transformed through multiplication by said transformation matrix. The output of the signal selection circuitry is connected to the input memory input which is at the rear of the $r$th submemory. Selection of the weighting coefficients throughout the sequential processing is controlled by the control unit. Moreover, the control unit feeds control signals to the signal selection circuitry to sequentially gate into the input memory either the input vector or one predetermined output of the output memory.

The detailed operation of the processor will now be described for an asymmetric processor implemented particularly to apply the discrete Fourier transform to an input vector. Thus, the processor, shown in FIG. 8, implements either of the two algorithms previously derived, namely, the asymmetric post permutation algorithm, Eq. 12 or Eq. 8, and the asymmetric ordered input ordered output, Eq. 14.

The set of N data points is gated-in in a parallel-bit serial-word form, from the terminal 'In' into the 'Input Memory'. The input memory is divided into $r$ equal blocks, or input queues, IM1, IM2, IM3, ....., IM$r$, and might be constructed of shift registers or any other type of memory. The 'tops' (fronts) of the $r$ queues are fed to a set of $r$ 'Pre-weighters'. These pre-weighters carry on the $r$-point transforms described by the operator $\vec{S}^{(r)}$ of Eq. 11.

Figure 8:
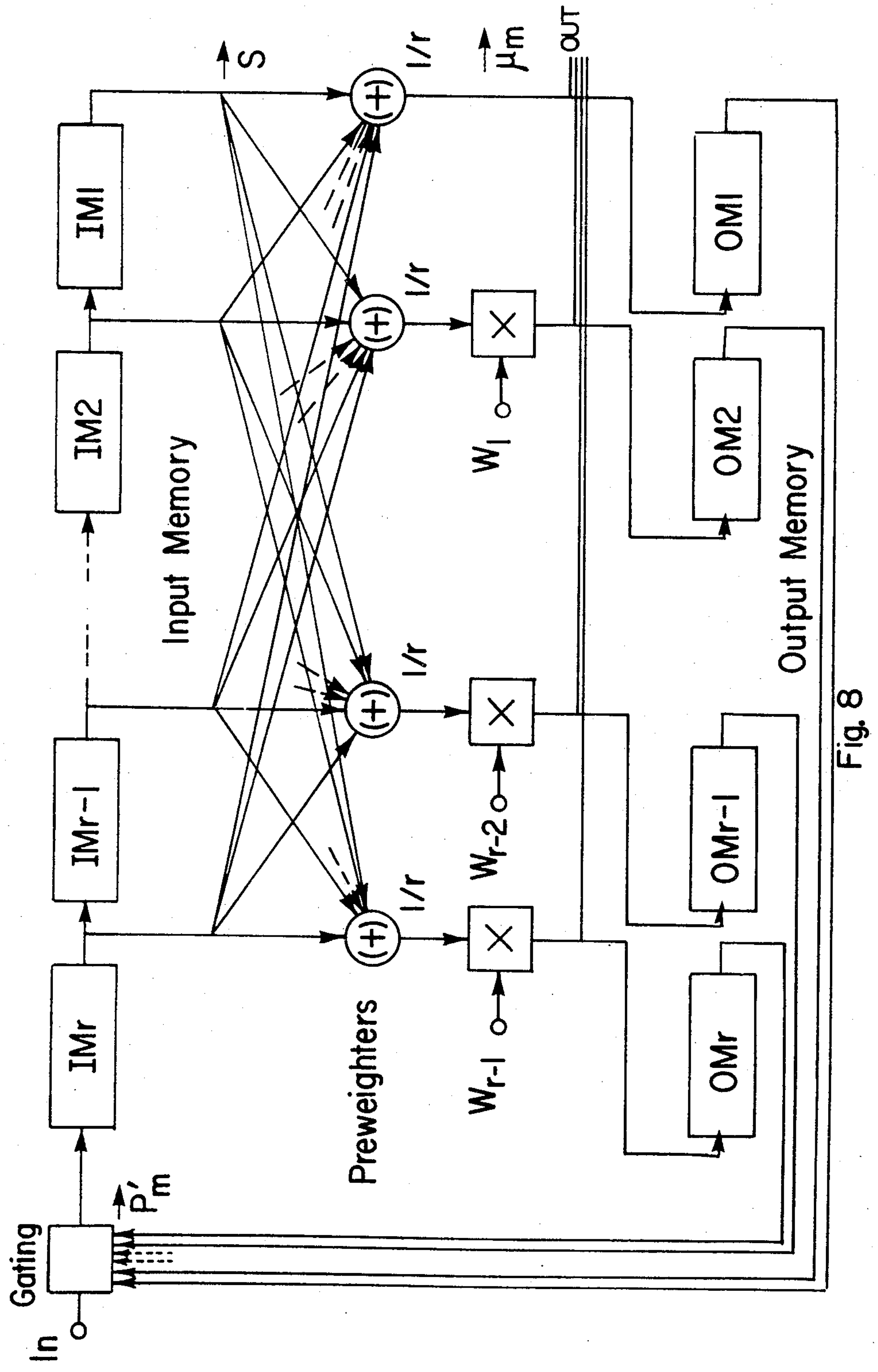
FIG. 8 shows an adaptation and implementation of the asymmetric processor for Fourier transformation and the computation of power spectra via Fourier transformation.

Following the pre-weighters, which are designated by circles including (+) in FIG. 8, the output is divided by $r$. This is to account for the factor (1/N) in the definition of the DFT.

The weighting or twiddle Operator $\vec{\mu}_m$ is performed next. This is accomplished by feeding the output into a set of ($r$—1) complex multipliers or vector rotators, designated by square boxes enclosing a (×) sign in the figure. The weighting coefficients constitute the other inputs to those multipliers.

The outputs of these operations are then routed to a set of output queues constituting the 'Output Memory' which is similar in construction to the input memory.

Upon gating the data into the output memory the tops of the input queues are popped up and the operation repeated on the new tops. This procedure is repeated, with the appropriate weighting coefficients always presented to the multipliers, until the input queues are emptied.

The permutation-operator is then performed by feeding the data in the output memory back into the input memory in the order described by the permutation operator $\vec{P}^{(r)}$ if the post permutation algorithm is the one implemented, or $\vec{p}_m^{(r)}$ if the algorithm implemented by the processor is the ordered input ordered output algorithm. Thus the top of OM1 is fed back, followed by that of OM2, then OM3, and so on till OMr.

The second iteration is then started. As seen by the equations describing the Algorithms, the operator $\vec{S}^{(r)}$ is the same throughout the $n$ iterations. This operator is thus applied to the data in the input queues in the same manner as performed in the first iteration. The weighting coefficients are different however and need be properly generated in accordance with the operator $\vec{\mu}_m^{(r)}$.

After weighting the data they are gated into the output memory in the same manner as described above. When the output queues are filled the feedback process is started.

If the Post-Permutation algorithm is the one implemented by the machine, then as shown in Eq. 12, the permutation operator $\vec{P}^{(r)}$ is identical throughout the iterations and thus the same feedback process described for the first iteration is implemented throughout the remaining ones. After the n iterations the Fourier coefficients appear in a scrambled order.

If the Ordered-Input Ordered-Output Algorithm is performed then the permutation operator $\vec{p}_m^{(r)}$ varies throughout the iterations. This operator calls for feeding back blocks of the queues OM1 to OMr successively. The sizes of these blocks are functions of the iteration step and are given, in general, by $r^{(m-1)}$ where $m$ is the iteration number. At the end of the $n$ iterations the Fourier coefficients appear therefore in proper order at the output. (Notice that the $n^{th}$ iteration calls for only preweighting of the data since $\vec{p}_1 = \vec{\mu}_1 = \vec{I}_N$).

The machine organization for $r$=4 will now be given as an example. We have $$\vec{S}^{(4)} = (\vec{I}_{N/4} \times \vec{T}_4)$$

where $$\vec{T}_4 = \begin{bmatrix} 1 & 1 & 1 & 1 \\ 1 & j & -1 & -j \\ 1 & -1 & 1 & -1 \\ 1 & -j & -1 & j \end{bmatrix}$$

Figure 9:
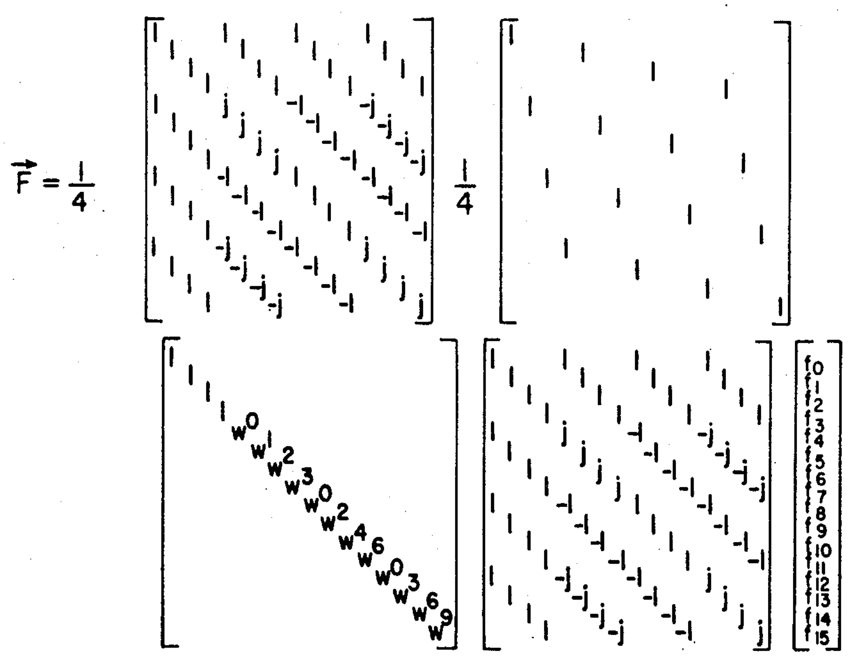
FIG. 9 shows an example of the asymmetric machine oriented fast Fourier transform algorithm factorization with a radix equal to 4 for a 16-point input record.

FIG. 9 shows the factorization for N=16 with ordered output as an example.

Figure 10:
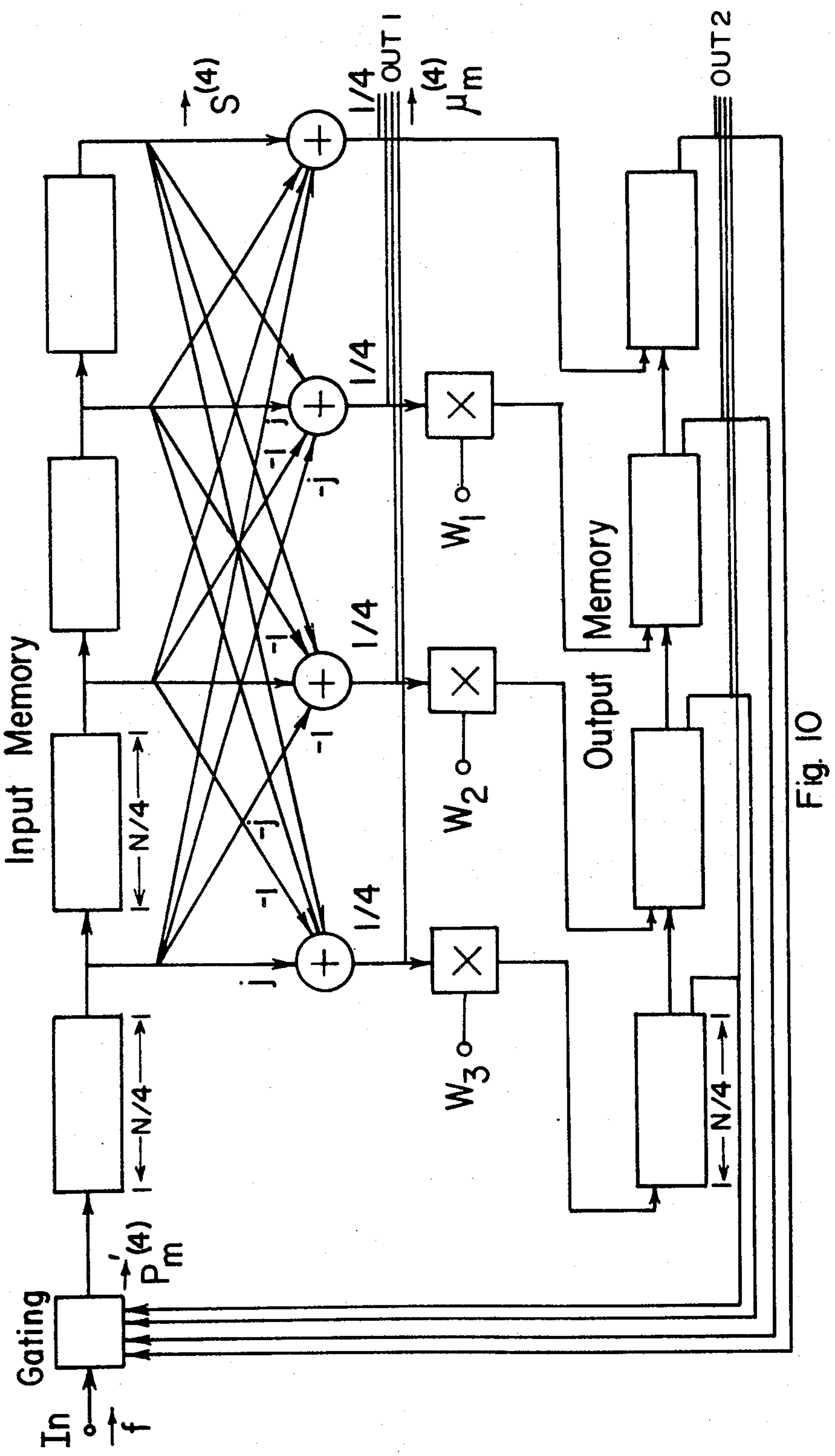
FIG. 10 shows an adaptation and implementation of the asymmetric processor when the value of the radix of factorization of the discrete Fourier transform is equal to 4.

The operator $\vec{S}^{(4)}$ calls, therefore, for preweighting by the values —1 and +$j$. FIG. 10 shows a radix-4 machine organization for implementing either of the two asymmetric algorithms.

The weighting coefficients signal source supplies simultaneously the weighting coefficients $W_1$, $W_2$, ..., $W_{r-1}$ to the arithmetic unit in a sequence of values determined by the operator $\vec{\mu}_m^{(r)}$ given by Eq. 10. This signal source may be a function generator, the task of which is simplified by the fact that the weighting coefficients, called for by the algorithm and fed to the arithmetic unit by the control unit, appear in a uniformly increasing order. The weighting coefficients signal source may also be in the form of a read-only memory in which the weighting coefficients are stored and sequentially accessed. The parallel machine organization, with a general radix $r$ would require $r$—1 separate storage submemories for the weighting coefficients. Each of these blocks has a storage capacity of N/$r$ words. The medium of storage can be either Read-Only memories or recirculating shift registers. When the latter are used, shifting of the coefficients is continuously performed, and periodically a set of coefficients is gated into a Latch. The Latch stores the coefficients and presents them to the arithmetic unit for a number of clock cycles specified by the algorithm.

The asymmetric algorithms to be implemented by the second implementation, that is the symmetric processor are now defined. The detailed derivation of the algorithms can be found in the first reference cited above, namely. M.J. Corinthios, "The Design of a Class of Fast Fourier transform computers", which will be referred to in the following as Reference 1. As shown in Reference 1 the matrix $\vec{T}_N$, which appears in Eq. 7 above, can be partitioned and factored and thus can be written in the form:

$$\vec{T}_N = \vec{T}_c \cdot \vec{T}_p \tag{16}$$

where $\vec{T}_p$ is a permutation matrix which when operating on the vector $\vec{f}$ yields a 'scrambled' record. $\vec{T}_c$ is a computation matrix which operating on the vector of the scrambled time series, $\vec{T}_p\vec{f}$, yields the vector $\vec{F}$ of properly ordered Fourier coefficients.

The computation matrix $\vec{T}_c$ can be factored and expressed in a form that is more suitable for a wired-in design. It may be shown that $\vec{T}_c$ can be written in the form $$\vec{T}_c = \prod_{m=1}^{n} (\vec{S}\vec{L}'_m\vec{P}') \tag{17}$$

where the matrices are to base $r$, i.e. to radix $r$;

$$\vec{P}' = \vec{P}_N' = \vec{P}_N^{-1} = [\vec{P}_N^{(r)}]^{-1} \qquad (18)$$

The superscript $r$ is the radix of factorization of the matrix $\vec{T}_N$;

$$\vec{I}_m' = \vec{I}_{r^{m-1}} \times \vec{D}_{N/r^{m-1}} \qquad (19)$$

or we write $$\vec{L}_i'' = \vec{P}\vec{L}_i'\vec{P}' \qquad (20)$$

which when substituted into Eq. 17 yields $$\vec{T}_c = \prod_{m=1}^{n} (\vec{S}\vec{P}'\vec{L}''_m) \qquad (21)$$

This is the symmetric Pre-Permutation algorithm to a general radix $r$. It operates on a scrambled record and produces properly ordered Fourier coefficients.

Symmetric Ordered-Input Ordered-Output forms can also be obtained. It may be shown that $\vec{T}_N$ can be factored and expressed in the form $$\vec{T}_N = \prod_{m=1}^{n} (\vec{S}^{(r)}\vec{U}_m\vec{R}_m^{(r)}) \qquad (22)$$

where $$\vec{U}_i = \vec{I}_{r^{i-1}} \times \vec{D}_{N/r^{i-1}} \qquad (23)$$

$$\vec{R}_i^{(r)} = \vec{I}_{r^{i-1}} \times \vec{P}'_{N/r^{i-1}} \qquad (24)$$

or if we write $$\vec{B}^{i-1}_{N/r} = \vec{P}^{i-1}_{N/r}\vec{D}^{i-1}_{N/r}\vec{P}'^{i-1}_{N/r} \qquad (25)$$

and $$\vec{u}_i = \vec{I}_r^{i-1} \times \vec{B}^{i-1}_{N/r} \qquad (26)$$

and hence $$\vec{U}_i\vec{R}_i = \vec{R}_i\vec{u}_i \qquad (27)$$

then we have the symmetric Ordered-Input Ordered-Output Algorithm in the form:

$$\vec{T}_N = \prod_{m=1}^{n} (\vec{S}^{(r)}\vec{R}_m^{(r)}\vec{u}_m). \qquad (28)$$

For example, for N=64=$4^3$, the weighting operators of the symmetric algorithm are given by:

$\vec{u}_3 = \vec{I}_{64}$ $\vec{u}_2 =$ diag (1, 1, 1, 1, $w^0$, $w^0$, $w^0$, $w^0$, $w^0$, $w^0$, $w^0$, $w^0$, $w^0$, $w^0$, $w^0$, $w^0$,
1, 1, 1, 1, $w^4$, $w^4$, $w^4$, $w^4$, $w^8$, $w^8$, $w^8$, $w^8$, $w_{12}$, $w_{12}$, $w_{12}$, $w_{12}$,
1, 1, 1, 1, $w^8$, $w^8$, $w^8$, $w^8$, $w^{16}$, $w^{16}$, $w^{16}$, $w^{16}$, $w^{24}$, $w^{24}$, $w^{24}$, $w^{24}$,
1, 1, 1, 1, $w^{12}$, $w^{12}$, $w^{12}$, $w^{12}$, $w^{24}$, $w^{24}$, $w^{24}$, $w^{24}$, $w^{36}$, $w^{36}$, $w^{36}$, $w^{36}$, $\vec{u}_1 =$ diag (1, $w^0$, $w^0$, $w^0$, 1, $w^1$, $w^1$, $w^3$, 1, $w^2$ $w^4$, $w^6$, 1, $w^3$, $w^6$, $w^9$,
1, $w^4$, $w^8$, $w^{12}$, 1, $w^5$, $w^{10}$, $w^{15}$, 1, $w^6$, $w^{12}$, $w^{18}$, 1, $w^7$, $w^{14}$, $w^{21}$,
1, $w^8$, $w^{16}$, $w^{24}$, 1, $w^9$, $w^{18}$, $w^{27}$, 1, $w^{10}w^{20}$, $w^{30}$, 1, $w^{11}$, $w^{22}$, $w^{33}$,
1, $w^{12}$, $w^{24}$, $w^{36}$, 1, $w^{13}$, $w^{26}$, $w^{39}$, 1, $w^{14}$, $w^{28}$, $w^{42}$, 1, $w^{15}$, $w^{30}$, $w^{45}$).

Figure 6:
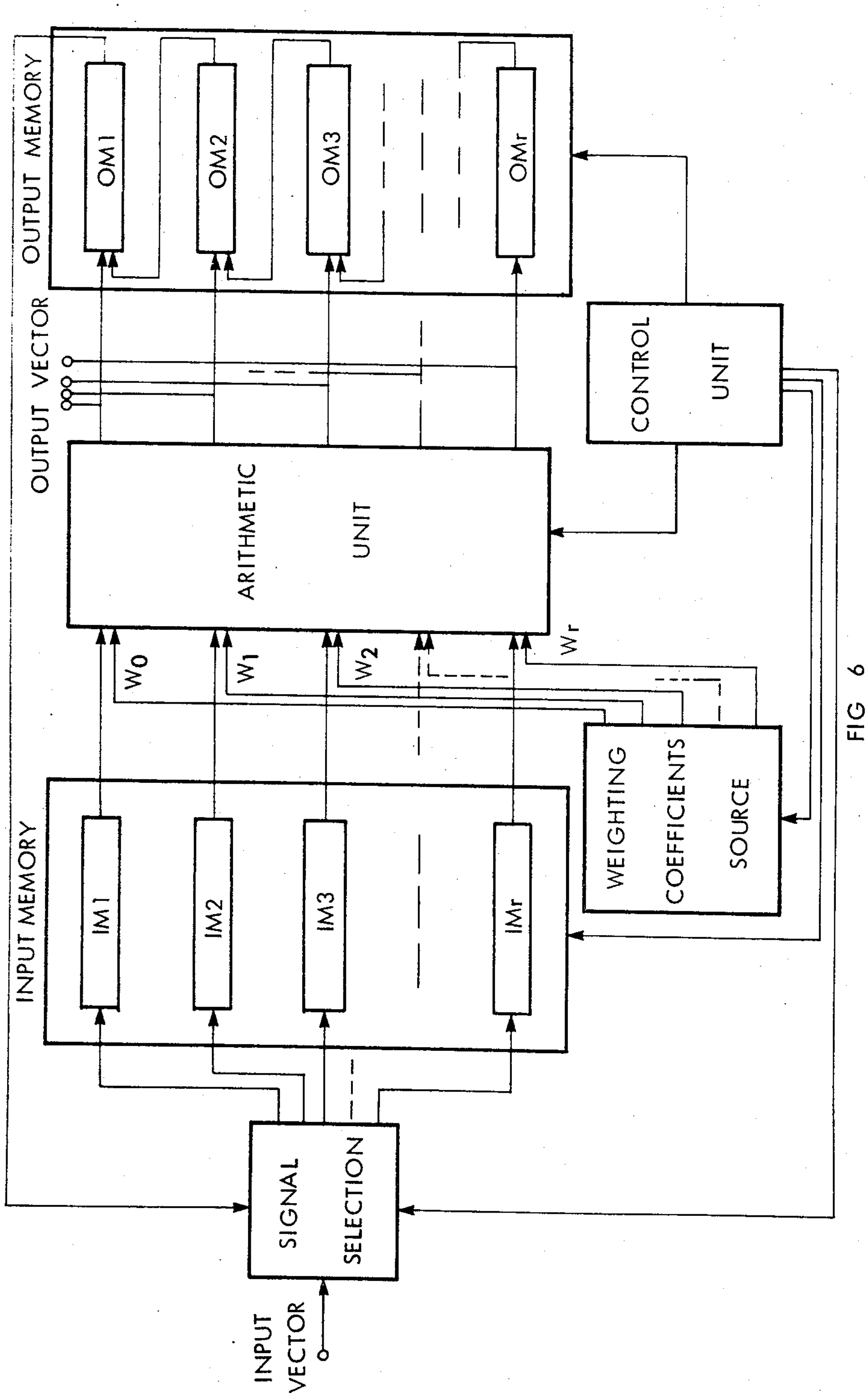
FIG. 6 is a second implementation of the basic signal processor, referred to in the following as symmetric processor.

The symmetric processor implementing the symmetric algorithm is shown in FIG. 6. The main units comprised by the processor have been previously described in the statement of the invention, where the processor was described as the second of three implementations. In this symmetric processor, vector rotators, or in general complex multipliers, are comprised and the symmetry of the algorithms allows the bypassing of the vector rotators during a fraction of the processing time that is inversely proportional to the radix $r$.

The detailed operation of the processor will now be described for a symmetric processor involving weighting coefficients obtained by factoring the discrete Fourier transform in particular. Thus the processor, which is shown in FIG. 11, implements algorithms given by Eqs. 21 and 22.

The processor is seen to contain $r$ channels, each of which includes an input-queue, a pre-weighter, a multiplier and an output-queue.

The set of N data points is gated-in in a parallel-bit serial-word form, from the terminal 'In' into the 'Input Memory'. The input memory is divided into $r$ equal blocks, or input 'queues', IM1, IM2, IM3, ...., IM$r$, and might be constructed of shift registeres or any other serial-type memory. The 'tops' (fronts) of the $r$ queues are fed to a set of $r$ 'Pre-weighters'. These pre-weighters carry on the $r$-point transforms described by the operators $S^{(r)}$.

Figure 11:
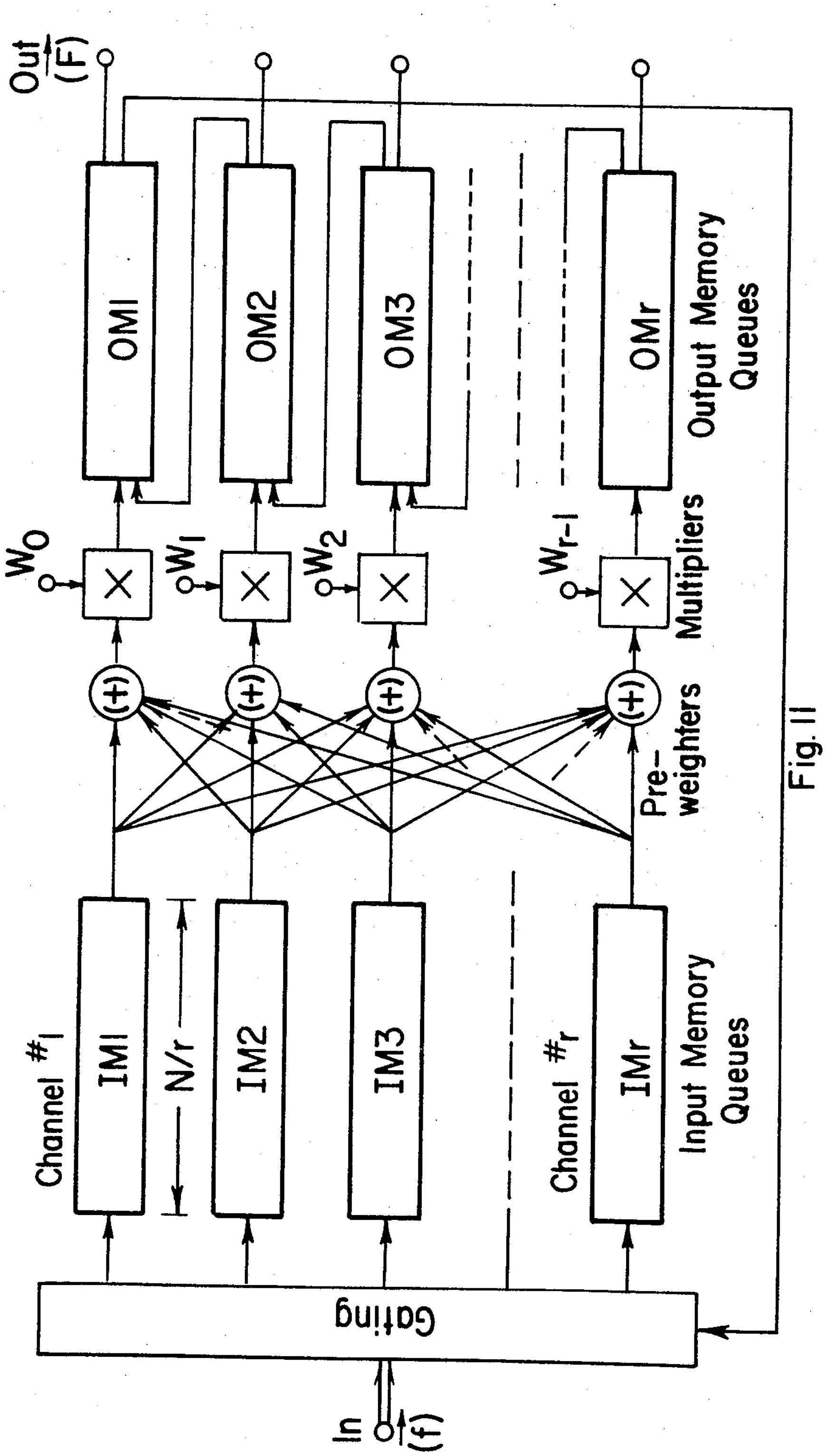
FIG. 11 shows an adaptation an implementation of the basic symmetric processor for Fourier transformation and the computation of power spectra via Fourier transformation.

Following the pre-weighters, which are designated by circles including (+) in FIG. 11, the output is divided by $r$. This is to account for the factor (1/N) in the definition of the DFT.

The weighting (twiddle) Operator $\vec{\mu}_m$ is performed next. This is accomplished by feeding the output into a set of ($r$—1) complex multipliers or vector rotators designated by square boxes enclosing a (x) sign in the figure. The weighting coefficients constitute the other inputs to these multipliers.

The outputs of these operations are then routed to a set of output queues constituting the 'Output Memory' which is identical in construction to the input memory.

Upon gating the data into the output memory the tops of the input queues are popped up and the operation repeated on the new tops. This procedure is repeated, with the appropriate weighting coefficients always presented to the multipliers, until the input queues are emptied.

The permutation-operator is then performed by feeding the data in the output memory back into the input memory in the order described by the permutation operator.

Referring to FIG. 11 we see that the feedback operation is performed by connecting the $r$ output queues to form one long queue, the top of which is the top of OM1. During the $i^{th}$ iteration a block of $r^{i-1}$ words is fed back from the top of OM1 to each of the input queues starting with IM1 down to IMr, and the process repeated until the output queue has been loaded into the input queues.

Subsequent iterations are similarly performed, with the proper weighting coefficients presented to the multipliers according to the weighting operator $u_m^{(r)}$.

The increase in speed over the asymmetric machines is due to the fact that the multiplication operations are equally distributed over the $r$ channels. At the portions of the iterations where only preweighting is required the $r$ multipliers are bypassed. Thus the computation time is limited to only preweighting instead of preweighting followed by weighting. Thus, in effect, the burden of multiplication is now equally distributed over the $r$ channels instead of $r-1$ channels. The increase in speed is proportional to $1/r$ and is a function of the ratio of the time of performing preweighting followed by weighting to that of preweighting only.

The high speed algorithms and implementing processor referred to earlier as the third implementation and as the high speed processor are now described. The detailed derivation of the algorithms can be found in the second reference by M.J. Corinthios, cited above, titled "A fast Fourier transform for high speed signal processing" which will be referred to in the following as Reference 2.

Each of the asymmetric and symmetric processors described above comprises a fully wired-in arithmetic unit. These processors are simple in organization and being hardwired require very little control.

It is noted, however, that in these implementations each iteration calls for a feedback phase in which data are serially moved from the output to the input memory in an order determined by a permutation operator. When $r$ is increased, therefore, the computation time is proportionally reduced while that of the feedback phase remains the same.

In an implementation in which the rate of moving data in memory is an order of magnitude, say, higher than the rate of performing arithmetic, such a machine organization yields a reasonable compromise between cost of machine and processing speed. However, if the speed of performing arithmetic approaches that of moving data in memory, the over-head time spent in the permutation phases becomes unreasonable. We thus search for an algorithm which would reduce or eliminate the feedback of time; probably at the cost of a deviation from ideal hardwired conditions.

The high speed algorithm to be described now and the implementing high speed processor help us achieve this objective. The feedback phase is completely eliminated and 100 percent utilization of the arithmetic unit obtained. The price paid, in the form of a need for some addressing or added gating, will be shown to be well justified.

By performing a simple modification on any of the asymmetric or symmetric algorithms described above a corresponding high speed algorithm is obtained. This modification is performed here on the asymmetric ordered input ordered output algorithm as in illustration. The resulting algorithm will be referred to in the following as the high speed asymmetric ordered input ordered output algorithm or, for brevity, as the high speed ordered input ordered output algorithm. Organization of the high speed symmetric processor which implements either the high speed asymmetric ordered input ordered output algorithm or postpermutation algorithm then follows. Application of the technique to the symmetric algorithms to obtain high speed symmetric algorithms and high speed asymmetric processor is straightforward. The asymmetric ordered input ordered output algorithm, Eq. 14, is given by:

$$\vec{T}_N = \vec{S}^{(r)} \vec{p}_2^{(r)} \vec{\mu}_2^{(r)} \vec{S}^{(r)} \ldots \vec{p}_{n-1}^{(r)} \vec{\mu}_{n-1}^{(r)} \vec{S}^{(r)} \vec{p}_n^{(r)} \vec{\mu}_n^{(r)} \vec{S}^{(r)} \quad (29)$$

which can be rewritten as:

$$\vec{T}_N = \vec{S}_1^{(r)} \vec{\mu}_2^{(r)} \vec{S}_2^{(r)} \vec{\mu}_3^{(r)} \ldots \vec{S}_{n-2}^{(r)} \vec{\mu}_{n-1}^{(r)} \vec{S}_{n-1}^{(r)} \vec{\mu}_n^{(r)} \vec{S}_n^{(r)} \quad (30)$$

i.e.

$$\vec{T}_N = \prod_{m=1}^{n} (\vec{\mu}_m^{(r)} \vec{S}_m^{(r)}) \quad (31)$$

where, in general, $$\vec{S}_{m-1}^{(r)} = \vec{S}(r)\ (r)\vec{p}_m \quad ; m=2,3,\ldots n; \quad (32)$$

$$\vec{S}_n^{(r)} = \vec{S}^{(r)}; \quad (33)$$

and $\vec{\mu}_1 = \vec{I}_N$ (34)

We now show that the 'preweighting' operator $\vec{S}_m^{(r)}$ calls always for combining data that are at least $N/r^2$ words apart. Omitting the superscript $(r)$, since it is known that operations are performed to base $r$ we have, for $m \neq 1$:

$$\vec{S}_{m-1} = \vec{S}\vec{p}_m = (\vec{I}_{N/r} \times \vec{T}_r)\,\vec{p}_m \quad (35)$$

$$= \vec{p}_m\,\vec{p}_m^{-1}\,(\vec{I}_{N/r} \times \vec{T}_r)\,\vec{p}_m \quad (36)$$

and we can easily show that $$\vec{p}_m^{-1}\,(\vec{T}_{N/r} \times \vec{T}_r(\vec{p}_m = (\vec{I}_{N/r^2} \times \vec{T}_r \times \vec{I}_r) \quad (37)$$

and therefore $$\vec{S}_{m-1} = \vec{p}_m\,(\vec{i}_{N/r^2} \times \vec{T}_r \times \vec{T}_r). \quad (38)$$

Thus we can see that the matrix $\vec{I}_{N/r^2}$ in the second factor causes the operator $\vec{S}_{m-1}$ to operate on data that are always $N/r^2$ words apart. In the first iteration however, the operator $\vec{S}_n$ operates on data which are $N/r$ words apart.

Figure 12:
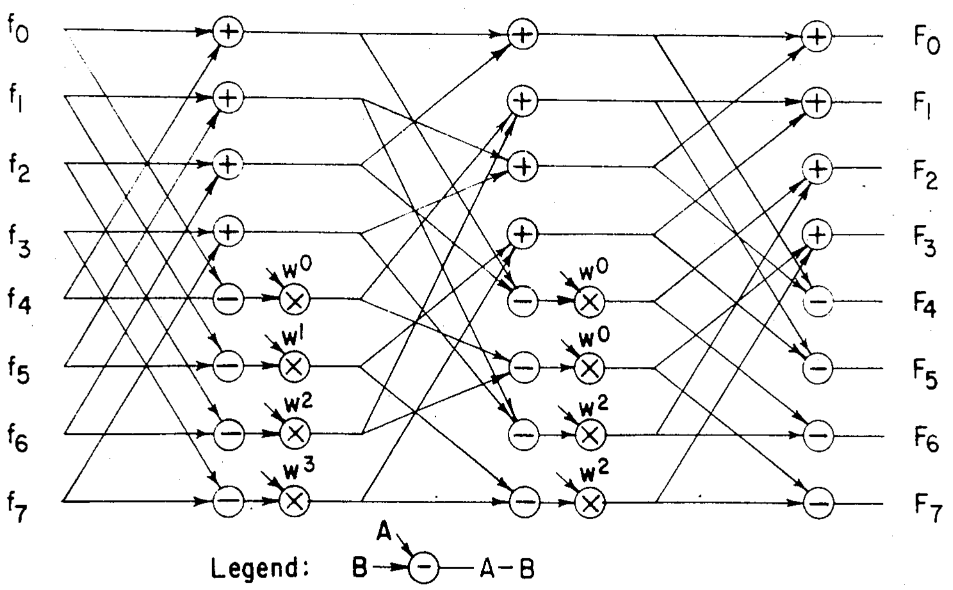
FIG. 12 shows a flow diagram representation of the high speed ordered input ordered output machine oriented algorithm for the example of a radix-2 factorization of the discrete Fourier transform for the case of an 8-point input record. This algorithm is implemented in the organization of the high speed signal processor.

FIG. 12 shows a flow diagram of the high speed ordered input ordered output for the case N=8 and $R=2$ as an example. We observe that in no iteration do we need to simultaneously access data that are closer than $N/r^2=2$ words apart and that the results of addition and subtraction of two operands are always spaced by $N/r=4$ words.

Figure 7:
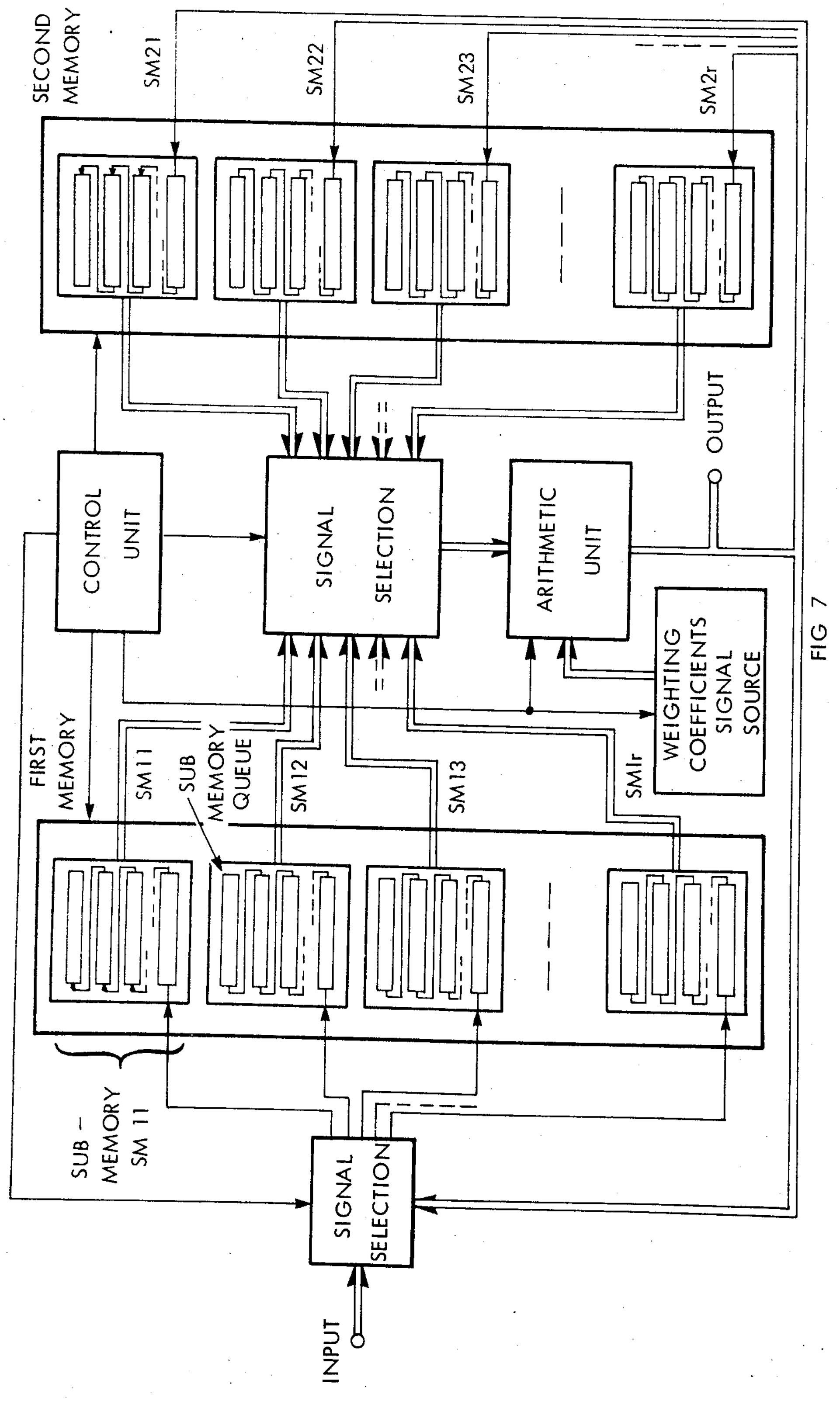
FIG. 7 is a third implementation of the signal processor, referred to in the following as the high speed processor.

The high speed processor implementing the high speed algorithms is shown in FIG. 7. The main units comprised by the processor have been previously described in the statement of the invention, where the processor was described as the third of three implementations. The main difference between the present high speed processor and the previous asymmetric and symmetric processors is that the present processor has two signal selection circuitries, each of first and second memory is divided into $r$ submemories in the form of queues each of which is in turn divided into $r$ shorter queues. The arithmetic unit is not fully hardwired to either of the two memories, and the arithmetic unit is utilized 100 percent of the time, since data always flow in this processor from one of the two memories, through the arithmetic unit and stored in the other memory.

Figure 13:
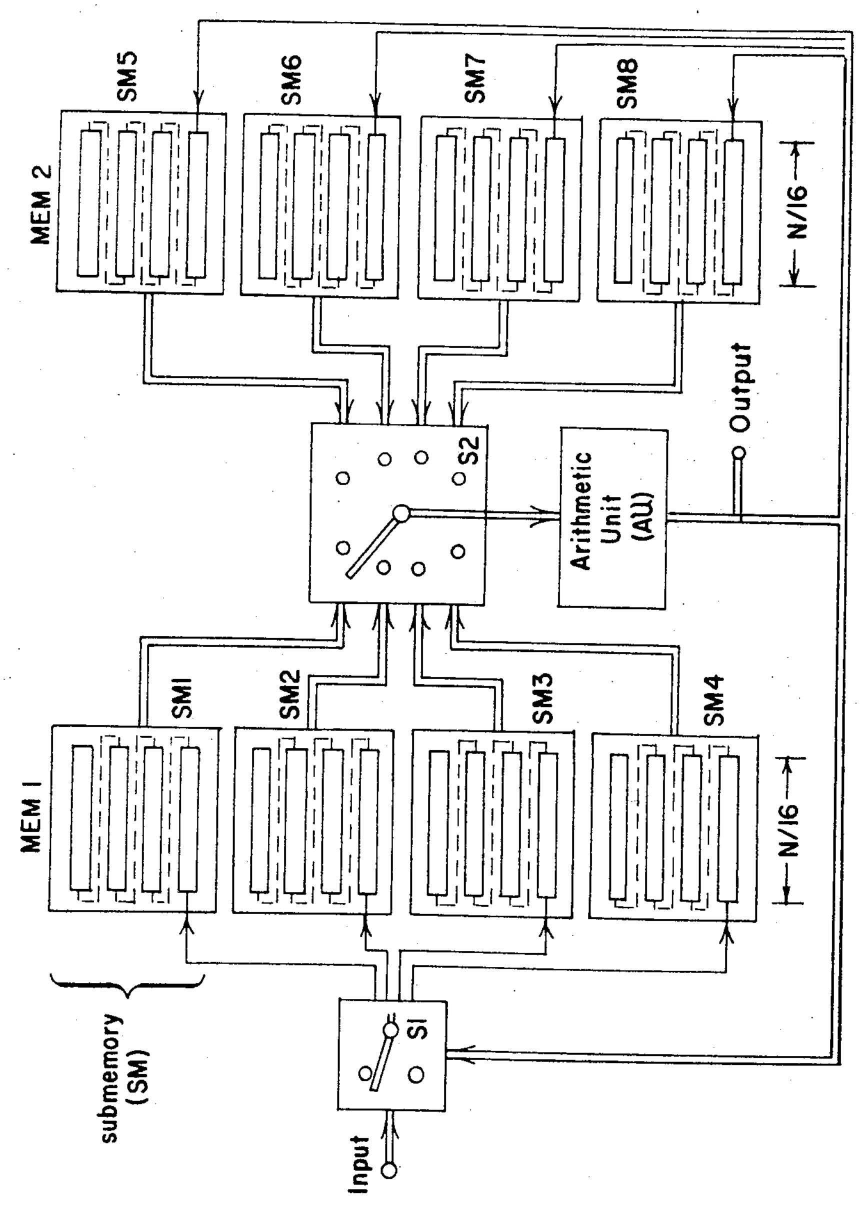
FIG. 13 shows, as an example, an adaptation and implementation of the high speed processor when the value of the radix of factorization of the discrete Fourier transform is equal to 4.

FIG. 13 shows an example of an adaptation and implementation of the high speed processor for the particular application of Fourier transformation and for the particular value of the radix of factorization of the discrete Fourier transform equal to 4.

As shown in FIG. 13 the machine includes two memories MEM1 and MEM2, each storing N words, an arithmetic unit (AU), a read-only memory or equivalent, and two signal selection means designated in the figure as S1 and S2. The AU includes preweighters and weighters, and is identical to that employed in either the asymmetric or symmetric processors; depending on whether the algorithm implemented by the high speed processor is a high speed asymmetric or symmetric algorithm. Assuming arithmetic is to be performed at the data-shifting speed, this machine is $r+1=5$ times as fast as the corresponding hardwired processors previously described. This gain in speed is achieved by eliminating the permutation operation in which N words were fed back from the output to the input memory after each iteration. The price paid is mainly the added gating.

Both MEM1 and MEM2 are divided into $r$ submemories (SM), each of length $N/r^2$; and each SM is again divided into $r$ queues. Each queue may consist of a long shift register for each bit of the data words. Switch S gates $r$ words at each clock pulse to the AU. In all but the first iteration these words constitute the data at the tops of the $r$ queues of a selected SM. In the first iteration, the queues of each SM are connected to form a long queue, and the $r$ words at the tops of the thus formed queues are fed to AU through S2. (To simplify the diagram this connection is not shown explicitly in FIG. 13). When the input data to the AU are selected from MEM1, S2 gates the output $r$ words of the AU to MEM2 and vice versa. Switch S1 is obviously needed for gating new data into the machine.

At each clock the data in the queues are shifted one bit to the right. When MEM1, say, is empty and MEM2 full, S2 starts to access data from MEM2, which acts then as a data 'source' and the output of AU is stored into MEM1, which acts as a 'sink'. When either MEM1 or MEM2 is in the sink mode, the $r$ queues in each of its SM's are connected to form one long queue, to the rear of which data is fed.

The nth iteration calls for preweighting only; no multiplication is required. Thus the data at the output of the preweighter are gated, during the nth iteration, out of the processor and the Fourier coefficients are in proper order. If the algorithm implemented were a post-permutation algorithm, then all iteration after the first are identical. However, the output coefficients are not then in a properly ascending order, unless post-ordered.

We note that the data source during $n$th iteration can be either MEM1 or MEM2 depending on n being odd or even respectively. During this same iteration new data or unloaded from the Input Buffer (IB), which is needed for realtime operation, and stored in MEM1. If $n$ is odd, the IB may have to be partitioned into $r$ queues, so that the new record would be all in MEM1 at the instant the last $r$ points of the previous record leave MEM1. Alternatively, the IB may be partitioned into $r$ long queues and unloaded into MEM2 during the $n$th iteration; the choice being hardware-dependent. If $n$ is even the IB consists of $r$ long queues and is unloaded into MEM1 during the $n$th iteration.

We also note that, since the last iteration includes no multiplication ($\vec{\mu}_1 = \vec{I}_n$ ), the power spectrum can be evaluated during the $n$th iteration by making use of the otherwise idle multipliers. This is performed by gating the Fourier coefficients $a+jb$, at the outputs of the preweighters, into the complex multipliers, or vector rotators, and multiplying them by their conjugates to obtain the components ($a^2$ 7 + $b^2$) of the power spectrum. Power spectra can thus be computed in the same time as that required to perform the Fourier transformation. The power spectrum is also obtained in proper order which is advantageous in most applications.

Moreover, we have noticed that the first iteration differs from subsequent ones in its call for operation on data which are $N/r$ rather than $N/r^2$ points apart. To avoid this non-uniformity with its effect on the size of S2 we perform a permutation operation while unloading IB into MEM1. The $r$- point transform of the first iteration can then be made identical to one of the other $N-1$ iterations. One choice is to make the first iteration identical to the last, i.e.

$$\vec{S}_n = \vec{S}_1 \tag{39}$$

and, using Eq. 35 we have $$\vec{S} = \vec{S}_1 \vec{p}_2^{\,-1} \tag{40}$$

and $$\begin{aligned} \vec{P}_2^{-1} &= (\vec{I}_{r^{n-2}} \times \vec{P}_{r^2})^{-1} \\ &= \vec{I}_{r^{n-2}} \times \vec{P}_{r^2}^{-1} \\ &= \vec{I}_{N/r^2} \times \vec{P}_{r^2} = \vec{P}_2 \end{aligned} \tag{41}$$

Figure 15:
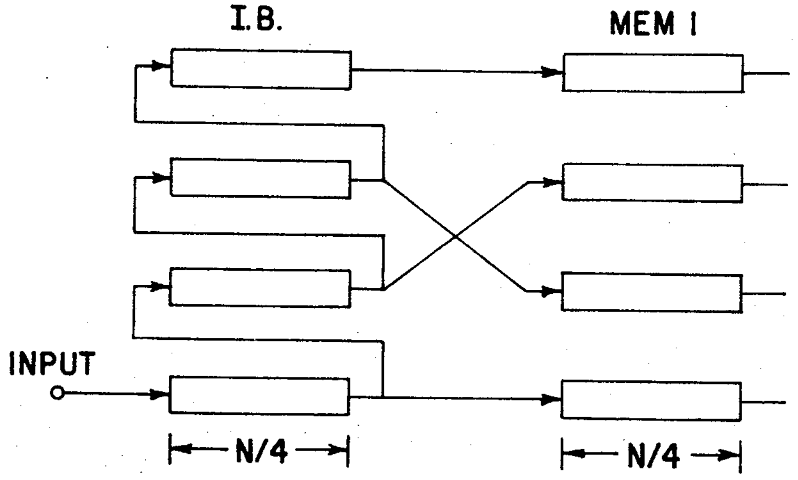
FIG. 15 shows an example of the application of a permutation operation on the input data to obtain more uniform iterations, as implemented in a radix-2 processor.
Figure 14:
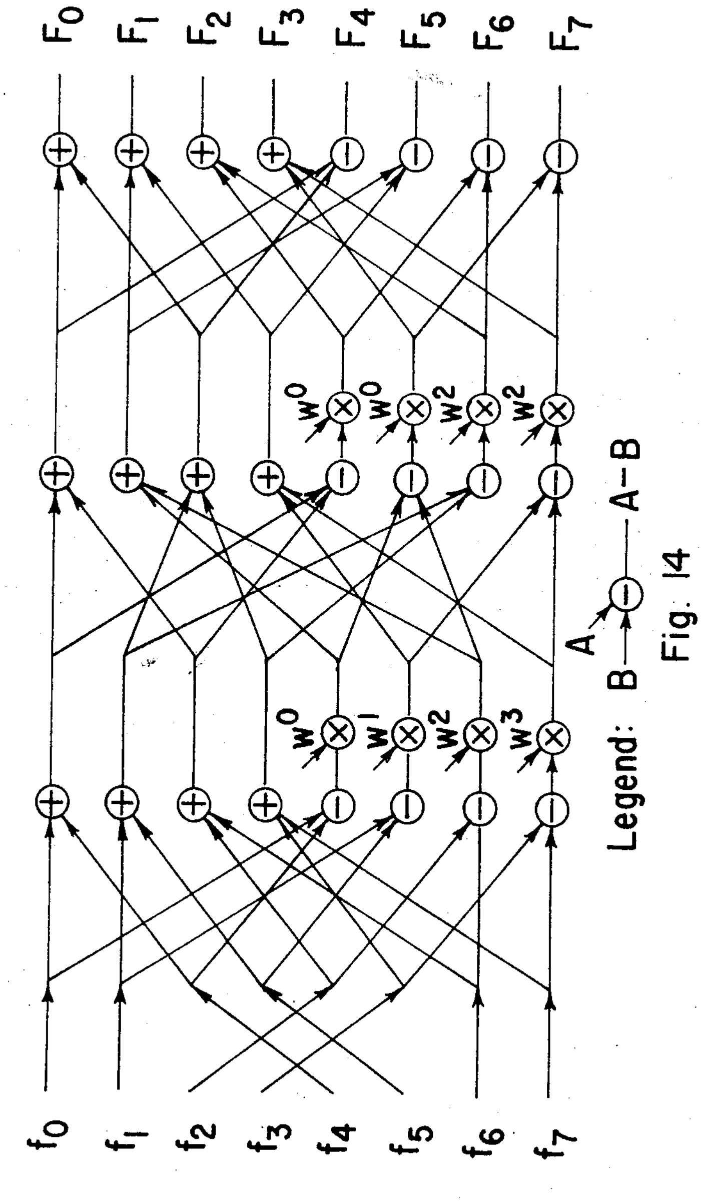
FIG. 14 shows a flow diagram representation of the high speed ordered input ordered output machine oriented algorithm including a factorization of the first iteration to yield more uniform iterations, for the example of a radix-2 factorization of the discrete Fourier transform for the case of an 8-point input record.

FIG. 14 shows a flow diagram of the modified algorithm where the operator $\vec{S}_n$ is factored into a permutation operator $\vec{p}_2$ followed by operator $\vec{S}_1$. A schematic diagram of the interconnection between IB and MEM1 for a radix-2 machine is shown in FIG. 15. The permutation described by $\vec{p}_2$ is thus performed while IB is unloaded into MEM1.

Another point to notice regarding the processors described in this invention is the fact that at the present time, except for a very small data arrays, a cascade processor may prove to be prohibitively expensive. Within a decade this may not be the case, however. The conversion of the machine described into a cascade one is conceptually straightforward. Thus instead of using an input buffer memory and oscillating or circulating data successively between two memories, we utilize a number of memory arrays equal to the number of stages (iterations) in the algorithm. The machine is thus a pipelined one, and the effective time of processing is the time of processing one stage. The number of arithmetic units is thus increased by an amount equal to the number of stages. Moreover, simultaneous weighting coefficients have to be furnished for each stage.

Real time processing of signals is achieved by the incorporation of an input buffer memory as shown in FIG. 2. Thus while a record is being processed a new one is accumulated into the input buffer memory. During the last iteration of the older record the new record data, i.e. the elements of the new input vector are gated into the processor. By dividing the buffer memory into submemories corresponding to the basic processor memories unloading of data from the buffer is made in parallel to match the organization of the processor. Moreover, as has been mentioned earlier the incorporation of an auxiliary memory would allow other processes of signal and time-series analysis such as auto- and cross-correlation, convolution functions and digital filtering.

For input vectors which are real-valued with a zero imaginary component it may be shown that it is possible to process two such real valued records simultaneously. This is performed by storing one of the records into the locations in the input, or first, memory which are otherwise occupied by the imaginary component. Separation of the two transforms after processing is achieved by performing an addition-subtraction operation on corresponding real and imaginary components of the output vector. A mathematical proof is found in the above mentioned Ph.D. thesis by M. J. Gorinthios. The fact the the output of the processor is properly order makes separation of the two records a simple problem.

As has been described the arithmetic unit contains a plurality of vector rotators or complex multipliers. A possible design of a complex multiplier is now briefly described in connection with FIG. 16.

The operands to the multiplier are two complex numbers. For parallel machine organization each multiplier would contain four multipliers for real numbers, two adders and a subtractor.

Addition and subtraction may be performed in two's complement. For multiplication, numbers may then be converted to sign-and-magnitude code, multiplied and reconverted back to two's complement.

The multiplier for real numbers has a three-dimensional form. The first step in the multiplier design is to AND each each bit of the multiplier with those of the multiplicand; as is performed in designing a simultaneous-type multiplier.

Figure 16:
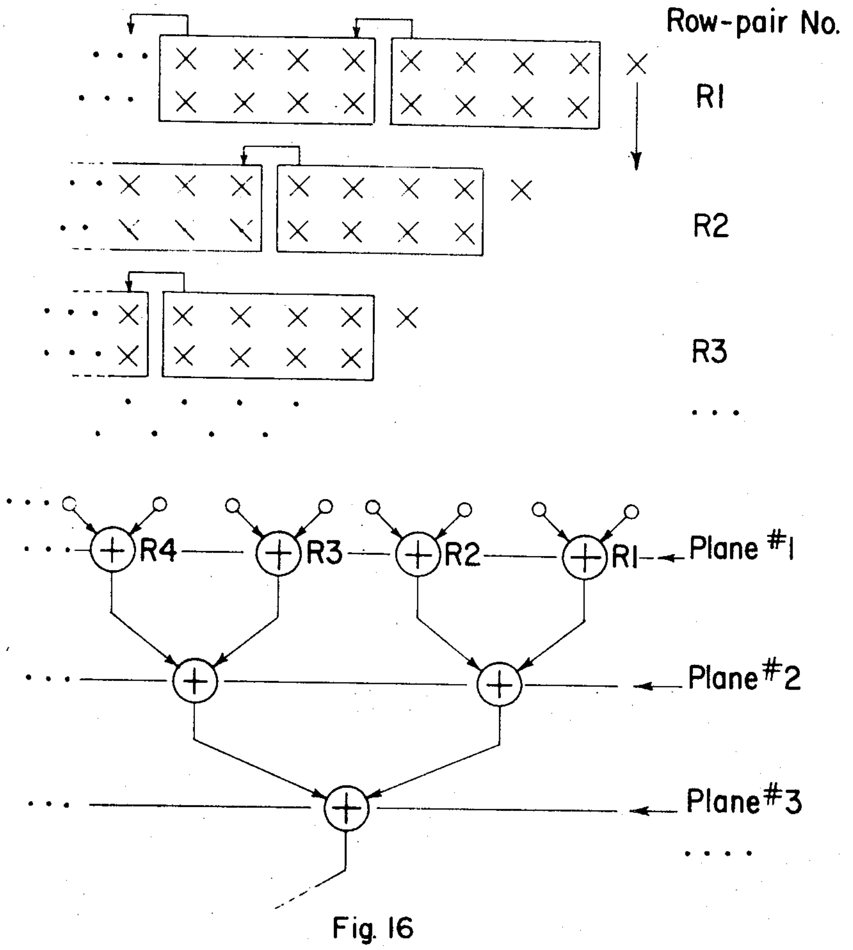
FIG. 16 shows one possible implementation of a multiplier for real numbers to be incorporated in the arithmetic unit.

The second step is shown schematically in FIG. 16. Each symbol × indicates an output from the AND ing matrix. The upper row of ×'s is the result of AND ing the least significant bit of the multiplier with the bits of the multiplicand; the second row is the result of ANDing the bit next to the least significant bit with the bits of the multiplicand, and so on.

The rectangles in FIG. 16 indicate 4-bit parallel adders. The arrows indicate the connection for the carry. What is shown in FIG. 16 is the first plane of the multiplier. The multiplier consists of $\log_2$ L such planes, where L is the word length.

The output bits of the first plane are the sums and carries from the parallel adders. The number of output bits of the first plane is therefore approximately half the number of input bits to the plane. If we denote the adders in the first two rows in FIG. 16 by R1, in the second two by R2, in the third R3 ... etc., then the multiplier can be represented schematically by the binary tree shown in the figure. The sets of adders R1, R2, R3 ... are represented here by circles including a (+) sign.

The carry bits are propagated within each plane (along rows), while the sum bits propagate from the first plane to the second to the third ... etc. If higher speed of multiplication is required then the carries of one plane are not propagated within the same plane but are fed to adders in the subsequent planes. This propagation of carries between planes reduces the time of multiplication since it synchronizes the arrival of the two operands and the carry input to each adder.

Figure 17:
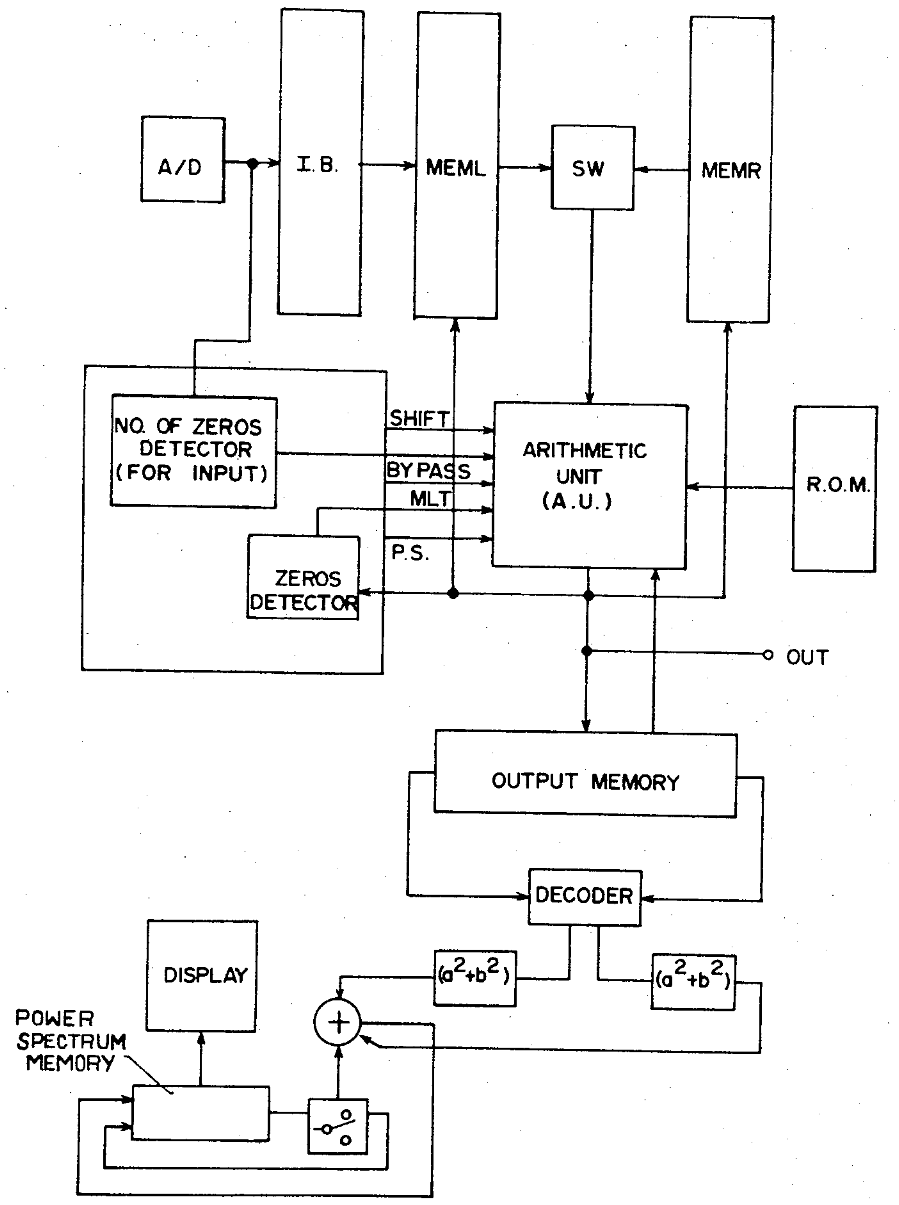
FIG. 17 shows in block form an adaptation and application of the processor simultaneous processing of two real-valued series and accumulating power spectra.

FIG. 17 shows as an application the organization of a processor which includes an input buffer I.B., is fed input data from an A/D converter, includes an output auxiliary memory, a decoder and a power spectrum accumulator. The control unit detects the number of leading zeroes during processing in order to perform array scaling on data, thus reducing the truncation or round off errors during computation. The illustration in FIG. 17 is designated MEML, processor where the first memory is the second memory MEMR and the signal selection circuitry SW. A read only memory R.O.M. is utilized as the weighting coefficients signal source. For simultaneous real time processing of two real valued records, once a transform has been computed the output of the processor is unloaded into the output memory. Data then are fed from opposite ends of the output memory, which is divided into two havles, into a decoder which separates the two transforms. The power spectrum of each transform is then computed by adding the square of the real and that of the imaginary part of each of the two transformed vectors. For averaging power spectra an accumulator is used to accumulate and scale spectra; and the averaged spectrum is displayed as shown in the figure.

It has been shown that by partitioning the data memory into $r^2$ instead of $r$ queues the feedback permutation operations were eliminated thus yielding the high speed processor. If arithmetic can be performed at the data shifting speed then the time of processing one iteration is that corresponding to $N/r$ shifting clock pulses, compared to $(N+N/r)$ in the fully wired-in asymmetric and symmetric processors. The speed of processing of the high speed processor is thus increased over the other two processors by a factor of $(r+1)$.

To achieve this high processing speed we made a compromise regarding the amount of hardwirig in the machine. The partitioning of the memories calls now for a larger number of shorter shift registers, if this is the medium of storage. However, this is not really significant, since integrated circuit registers are still relatively limited in length. Most of the cost is in the added gating, and some in the control. However, the cost increase may be justified by noting that the arithmetic unit, the R.O.M. and most other components of the system have not been changed; and, therefore, the fractional increase in cost is still low compared to the speed-up factor of $r+1$.

What I claim is:

1. A signal processor for transforming an input vector to an output vector which comprises:

a. an input memory having an input and a plurality of at least three outputs, b. an output memory having a plurality of at least three inputs and a plurality of at least three outputs, c. an arithmetic unit having a first plurality of at least three inputs and a second plurality of inputs less by one than the first plurality of inputs and a plurality of at least three outputs,
d. a weighting coefficients signal source having a plurality of at least two outputs, each connected to a corresponding one of said arithmetic unit second plurality of inputs for supplying said arithmetic unit with weighting coefficients signals,
e. a signal selection means, referred to in the following as the signal selection circuitry, having a first input and a second plurality of inputs and an output,
f. a control unit feeding control signals to said input memory, said output memory, said weighting coefficients signal source, and said signal selection circuitry,
g. each of said input memory plurality of outputs being connected to a corresponding one of said first plurality of arithmetic unit inputs and each output of said arithmetic unit being connected to a corresponding one of said output memory plurality of inputs,
h. said output memory outputs being connected to said signal selection circuitry second plurality of inputs,
i. said signal selection circuitry first input being said input vector to be transformed and said signal selection circuitry output connected to said input memory input,
j. said control unit providing means for moving data in said input and output memories, for selecting one of said signal selection circuitry inputs for feeding it to said input memory input in a predetermined sequence, and for sequentially feeding selected predetermined weighting coefficients signals from said weighting coefficients signal source outputs to said arithmetic unit second plurality of inputs,
k. said input memory having the form of a long queue which is divided into a plurality of at least three submemories in the form of shorter queues all connected in series, the input at the rear of the last of said submemories being said input memory input, the plurality of outputs at the fronts of the submemories are said input memory outputs,
l. said output memory, of same size as said input memory, is divided into a plurality of at least three submemories having the form of equal length queues, the plurality of inputs at the rears of said submemories are said output memory inputs, and the plurality of outputs at the fronts of said output memory submemories being said output memory outputs,
m. the number of said input memory submemories is equal to that of said output memory submemories, both being equal to the value of the radix of factorization of the transformation matrix which is to be multiplied by said input vector,
n. said arithmetic unit plurality of outputs being, at the end of processing, the required output vector that is the result of multiplying said transformation matrix by said input vector; and wherein
o. said value of the radix of factorization of the transformation matrix is restricted to be at least three.

2. In combination with a signal processor as defined in claim 1, an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

3. In combination with a signal processor as defined in claim 1, an input buffer memory for real-time on-line signal processing having input means and output means; elements of said input vector to be transformed being fed into said input buffer memory input means; said input buffer memory output means being connected to said input memory; said input vector elements being accumulated in said input buffer memory during processing of a preceding input vector by the signal processor; accumulated elements of said input vector being periodically gated from the input buffer memory into said input memory.

4. A combination as defined in claim 3, and further comprising an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

5. A signal processor for transforming an input vector to an output vector which comprises:
a. an input memory having a plurality of inputs and a plurality of outputs,
b. an output memory having a plurality of inputs and an output,
c. an arithmetic unit having a first plurality of inputs and a second plurality of inputs equal in number to the first plurality of inputs and a plurality of outputs,
d. a weighting coefficients signal source having a plurality of outputs each connected to a corresponding one of said arithmetic unit second plurality of inputs for supplying said arithmetic unit with weighting coefficients signals,
e. a signal selection means, referred to as the signal selection circuitry having a first and a second input and a plurality of outputs,
f. a control unit feeding control signals to said input memory, to said output memory, to said weighting coefficients signal source, to said arithmetic unit, and to said signal selection circuitry,
g. each of said input memory plurality of outputs being connected to a corresponding one of said first plurality of arithmetic unit inputs and each of said arithmetic unit outputs being connected to a corresponding one of said output memory plurality of inputs,
h. said output memory output being connected to said signal selection circuitry second input,
i. said signal selection circuitry first input being said input vector to be transformed and each of said signal selection circuitry plurality of outputs being connected to a corresponding one of said input memory plurality of inputs, j. said control unit providing means for moving data in said input and output memories, for selecting one of said signal selection circuitry inputs for feeding it to one of said input memory plurality of inputs in a predetermined sequence, for sequentially feeding selected predetermined weighting coefficients signals from said weighting coefficients signal source outputs to said arithmetic unit second plurality of inputs, and for providing signals to said arithmetic unit for bypassing predetermined arithmetic operations, k. said input memory being divided into a plurality of submemories having the form of queues, the plurality of inputs to said submemories are said input memory inputs and the plurality of outputs of said submemories are said input memory outputs, l. said output memory, having the form of a long queue, is divided into a plurality of submemories having the form of shorter queues all connected in series, the plurality of inputs to said output memory submemories are said output memory inputs, and the output at the front of the first of said output memory submemories being said output memory output , m. the number of said input memory submemories is equal to that of said output memory submemories, both being equal to the value of the radix of factorization of the transformation matrix which is to be multiplied by said input vector, n. said arithmetic unit plurality of outputs being, at the end of processing, the required output vector that is the result of multiplying said transformation matrix by said input vector; and wherein o. said value of the radix of factorization of said transformation matrix is integer.

6. In combination with a signal processor as defined in claim 5, an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

7. In combination with a signal processor as defined in claim 5, an input buffer memory for real-time on-line signal processing having input means and output means; elements of said input vector to be transformed being fed into said input buffer memory input means; said input buffer memory output means being connected to said input memory; said input vector elements being accumulated in said input buffer memory during processing of a preceding input vector by the signal processor; accumulated elements of said input vector being periodically gated from the input buffer memory into said input memory.

8. A combination as defined in claim 7, and further comprising an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

9. A signal processor for transforming an input vector to an output vector which comprises:

a. a first memory having a plurality of inputs and a plurality of outputs, b. a second memory having a plurality of inputs and a plurality of outputs, c. an arithmetic unit having a first and a second pluralities of inputs and a plurality of outputs, d. a weighting coefficients signal source having a plurality of outputs each connected to a corresponding one of said arithmetic unit second plurality of inputs for supplying said arithmetic unit with weighting coefficients signals, e. a first signal selection circuitry having a first and a second pluralities of inputs and a plurality of outputs, f. a second signal selection circuitry having a first and a second pluralities of inputs and a plurality of outputs, g. a control unit feeding control signals to said first memory, to said second memory, to said weighting coefficients signal source, to said arithmetic unit, and to said first and second signal selection circuitries, h. each of said first memory plurality of outputs being connected to a corresponding one of said second signal selection circuitry first plurality of inputs and each of said second memory plurality of outputs being connected to a corresponding one of said second signal selection circuitry second plurality of inputs, i. each of said second signal selection circuitry plurality of outputs being connected to a corresponding one of said arithmetic unit first plurality of inputs and each of said arithmetic unit plurality of outputs being connected to a corresponding one of each of said first signal selection circuitry second plurality of inputs and to a corresponding one of each of said second memory plurality of inputs, j. said first signal selection circuitry first plurality of inputs feed into the processor said input vector to be transformed and each of said first signal selection circuitry plurality of outputs being connected to a corresponding one of said first memory plurality of inputs, k. said control unit providing means for moving data in said first and second memories, for sequentially selecting a predetermined plurality from said first and second memories pluralities of outputs for feeding it to said arithmetic unit first plurality of inputs, for sequentially selecting a predetermined plurality from first selection circuitry first and second pluralities of inputs for feeding it to said first memory plurality of inputs, for sequentially selecting predetermined weighting coefficients signals from said weighting coefficients signal source outputs for feeding them to said arithmetic unit second plurality of inputs, and for feeding signals to said arithmetic unit for bypassing predetermined arithmetic operations, l. each of said first memory and second memory is divided into a plurality of submemories having the form of queues each of which is further divided into a plurality of shorter queues all connected in series and referred to in the following as the submemory queues, m. the plurality of inputs at the rears of said first memory submemories are said first memory inputs and the plurality of outputs at the fronts of said first memory submemory queues are said first memory plurality of outputs, n. the plurality of outputs of the submemory queues of each first memory submemory forms a subset of said first memory plurality of outputs, o. the plurality of inputs at the rears of said second memory submemories are said second memory inputs and the plurality of outputs at the fronts of said second memory submemory queues are said second memory plurality of outputs, p. the plurality of outputs of the submemory queues of each second memory submemory forms a subset of said second memory plurality of outputs, q. said second signal selection circuitry being a means for selecting one subset out of the subsets of both first and second memory pluralities of outputs, r. the number of said first memory submemories is equal to that of said second memory submemories, both being equal to the value of the radix of factorization of the transformation matrix which is to be multiplied by said input vector, s. the number of submemory queues in each of said first memory submemories is equal to the number of submemory queues in each of said second memory submemories, both being equal to the value of the radix of factorization of said transformation matrix, t. said arithmetic unit plurality of outputs being, at the end of processing, the required output vector that is the result of multiplying said transformation matrix by said input vector; and wherein u. said value of the radix of factorization of said input vector is integer.

10. In combination with a signal processor as defined in claim 9, an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

11. In combination with a signal processor as defined in claim 9, an input buffer memory for real-time on-line signal processing having input means and output means; elements of said input vector to be transformed being fed into said input buffer memory input means; said input buffer memory output being connected to said first memory; said input vector elements being accumulated in said input buffer memory during processing of a preceding input vector by the signal processor; accumulated elements of said input vector being periodically gated from the input buffer memory into said first memory.

12. A combination as defined in claim 11, and further comprising an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

13. In combination with a signal processor as defined in claim 9, an input buffer memory for real-time on-line signal processing having input means and output means; elements of said input vector to be transformed being fed into said input buffer memory input means; said input buffer memory output means being connected to said second memory; said input vector elements being accumulated in said input buffer memory during processing of a preceding input vector by the signal processor; accumulated elements of said input vector being periodically gated from the input buffer memory into said second memory.

14. A combination as defined in claim 13, and further comprising an auxiliary output memory comprising an input and a plurality of outputs; said input of said auxiliary memory being connected to one of said outputs of said arithmetic unit; one of said outputs of said auxiliary memory being connected to a further input of said arithmetic unit; whereby the output vector is temporarily stored in said auxiliary output memory for further processing in applications requiring the performance of arithmetic operations on at least one transformed vector.

* * * * *